United States Patent
Iwama et al.

(10) Patent No.: US 10,840,555 B2
(45) Date of Patent: Nov. 17, 2020

(54) NONAQUEOUS ELECTROLYTE BATTERY

(75) Inventors: Masayuki Iwama, Fukushima (JP);
Kenichi Kawase, Fukushima (JP);
Tomoo Takada, Fukushima (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 1215 days.

(21) Appl. No.: 13/294,771

(22) Filed: Nov. 11, 2011

(65) Prior Publication Data

US 2012/0135285 A1    May 31, 2012

(30) Foreign Application Priority Data

Nov. 25, 2010  (JP) ................. 2010-262760

(51) Int. Cl.
| | |
|---|---|
| *H01M 10/0583* | (2010.01) |
| *H01M 10/052* | (2010.01) |
| *H01M 10/04* | (2006.01) |
| *H01M 10/0587* | (2010.01) |
| *H01M 2/26* | (2006.01) |
| *H01M 2/30* | (2006.01) |
| *H01M 4/70* | (2006.01) |

(52) U.S. Cl.
CPC ......... *H01M 10/0583* (2013.01); *H01M 2/26* (2013.01); *H01M 2/30* (2013.01); *H01M 10/0431* (2013.01); *H01M 10/0459* (2013.01); *H01M 10/052* (2013.01); *H01M 10/0587* (2013.01); *H01M 4/70* (2013.01)

(58) Field of Classification Search
CPC ............. H01M 2/26; H01M 2/30; H01M 4/70
See application file for complete search history.

(56) References Cited

U.S. PATENT DOCUMENTS

| | | | | |
|---|---|---|---|---|
| 2002/0150815 A1* | 10/2002 | Ehara | ................. | H01M 2/1061 429/90 |
| 2002/0160258 A1* | 10/2002 | Lee | .................... | H01M 2/1686 429/130 |
| 2003/0134190 A1* | 7/2003 | Ishida | ................. | H01M 2/0207 429/162 |
| 2005/0277018 A1* | 12/2005 | Kim | ............................ | 429/120 |
| 2010/0190065 A1* | 7/2010 | Ihara | .................... | H01M 4/133 429/331 |
| 2010/0285353 A1* | 11/2010 | Katayama | ............... | H01M 2/26 429/185 |
| 2011/0274960 A1* | 11/2011 | Ahn | ...................... | H01M 2/021 429/136 |
| 2012/0015232 A1* | 1/2012 | Teshima | ............. | H01M 4/1395 429/145 |

FOREIGN PATENT DOCUMENTS

| | | | |
|---|---|---|---|
| JP | 2008-210617 | | 9/2008 |
| JP | 2008204902 | * | 9/2008 |
| WO | WO 2009157192 | * | 12/2009 |

OTHER PUBLICATIONS

JP 2008204902—translation.*

* cited by examiner

*Primary Examiner* — Ladan Mohaddes
(74) *Attorney, Agent, or Firm* — Chip Law Group

(57) ABSTRACT

There is provided a nonaqueous electrolyte battery including a first electrode having a strip shape, a second electrode having a strip shape, a first electrode lead, a second electrode lead, a separator having a strip shape that is disposed between the first electrode and the second electrode, and a nonaqueous electrolyte. A laminated electrode body, which is obtained by laminating the first electrode and the second electrode through the separator in such a manner that the second electrode lead is disposed at the other end portion of the second electrode not opposite to one end portion of the first electrode to which the first electrode lead is connected, is wound in a longitudinal direction with one end to which the first electrode lead is connected made as an initial end, and a wound electrode body is obtained.

5 Claims, 15 Drawing Sheets

21

22

26

26

NONAQUEOUS ELECTROLYTE BATTERY

CROSS REFERENCES TO RELATED APPLICATIONS

The present application claims priority to Japanese Patent Application No. 2010-262760 filed on Nov. 25, 2010, the disclosure of which is incorporated herein by reference.

BACKGROUND

The present disclosure relates to a nonaqueous electrolyte battery, and more particularly, to a nonaqueous electrolyte battery in which an electrode lead that extracts current is connected to a positive electrode and a negative electrode.

In recent years, a portable electronic apparatus such as a camera-integrated VTR (Video Tape Recorder), a cellular phone, and a notebook PC have become wide spread and weight reduction of such an apparatus has been attempted. Batteries, especially, secondary batteries, which are used as a portable power source of such an electronic apparatus, have been actively researched and developed in order to improve an energy density as a key device. Among the batteries, in a nonaqueous electrolyte battery such as a lithium ion battery, a large energy density may be obtained, compared to a lead battery and a nickel-cadmium battery that are aqueous electrolytic solution secondary batteries in the related art, such that reviews on the improvement of the nonaqueous electrolyte battery have been made in various fields.

In general, the lithium ion battery includes a positive electrode obtained by forming a positive electrode active material layer on both surfaces of a strip-shaped current collector and a negative electrode obtained by forming a negative electrode active material layer on both surfaces of a strip-shaped current collector, which are laminated with a separator interposed between the positive electrode and the negative electrode, or includes a battery device obtained by winding this laminated body plural times. An electrode lead that extracts current is connected to electrodes including the positive electrode and the negative electrode, respectively. A connection of the electrode lead is realized through an ultrasonic welding performed with respect to an exposed portion of the current collectors provided to the electrodes, or the like. In addition, similarly to Japanese Unexamined Patent Application Publication No. 2008-210617, in a case where a pattern of the negative electrode is formed with a relatively difficult method in manufacturing such as a deposition method and a thermal spraying method, there is disclosed a method in which an electrode lead is caulked together with an electrode and is connected to the electrode.

SUMMARY

However, in such a battery device, in a case where an impact is applied to the battery from the outside or the battery is compressed, in a case where the electrode is expanded due to a charge and discharge, or the like, there is concern that the electrode lead may cause damage to an adjacent separator. Particularly, corner portions of an end portion of the electrode lead may cause damage to the separator more easily. When the electrode lead causes damage to the separator, the positive electrode and the negative electrode are short circuited, and this causes abnormal heat generation or a decrease in a battery characteristic, or causes cutting-off of the electrode. In addition, burrs are generated in the end portion of the electrode lead due to the cutting-off, and in this case, the separator may be damaged further more easily.

Particularly, in a battery device including an electrode using an alloy-based active material including silicon (Si) or tin (Sn) as a main component, in which expansion and contraction in the active material layer due to, for example, charge and discharge occurs relatively remarkably, a pressure in the battery during the charge and discharge increases and therefore stress is focused on the end portion of the electrode lead. Therefore, the end portion of the electrode lead may easily cause damage to the separator. In the case of a battery device configuration in which the electrode lead is disposed between opposite planes of the positive electrode and the negative electrode, such a problem may more easily occur.

In addition, in regard to a wound type battery device, in a case where the electrode lead is disposed at the outermost portion of the battery device, stress at an edge of the electrode lead accompanied with the expansion and contraction of the electrode active material may deform the current collector to which the electrode lead is connected. The deformed current collector may cause damage to the separator.

The present disclosure has been made in consideration of the above-described problems, and it is desirable to obtain a highly stable nonaqueous electrolyte battery by suppressing stress, which is a cause of damage, in a separator from being focused on an end portion of an electrode lead.

According to an embodiment of the present disclosure, there is provided a nonaqueous electrolyte battery including a first electrode having a strip shape; a second electrode having a strip shape; a first electrode lead that is disposed to extend in such a manner that one end side that overlaps with the first electrode is connected to the first electrode in the vicinity of a short side thereof and the other end side protrudes from one side edge of the first electrode; a second electrode lead that is disposed to extend in such a manner that one end side that overlaps with the second electrode is connected to the second electrode in the vicinity of a short side thereof and the other end side protrudes from one side edge of the second electrode; a separator having a strip shape, which is disposed between the first electrode and the second electrode, and has external dimensions larger than those of both the first electrode and the second electrode; and a nonaqueous electrolyte, wherein a laminated electrode body, which is obtained by laminating the first electrode and the second electrode through the separator in such a manner that the second electrode lead is disposed at the other end portion of the second electrode not opposite to one end portion of the first electrode to which the first electrode lead is connected, is wound in a longitudinal direction with one end to which the first electrode lead is connected made as an initial end, and a wound electrode body is obtained, in regard to the laminated electrode body, the second electrode and the second electrode lead are connected to each other in such a manner that an electrode connection side one end, which is connected to the second electrode, of the second electrode lead is located at a position that is opposite to either the first electrode or the second electrode, or a position that is opposite to neither the first electrode nor the second electrode, and the wound electrode body is accommodated in a battery exterior body that covers and seals the wound electrode body together with the nonaqueous electrolyte.

According to another embodiment of the present disclosure, there is provided a nonaqueous electrolyte battery including plural sheets of first electrodes having a rectangular shape; plural sheets of second electrodes having a rectangular shape; a plurality of first electrode leads that are disposed to extend in such a manner that one end side that overlaps with each of the first electrodes is connected to each of the first electrodes in the vicinity of a short side thereof and the other end side protrudes from one side edge of each of the first electrodes; a plurality of second electrode leads that are disposed to extend in such a manner that one end portion side that overlaps with each of the second electrodes is connected to each of the second electrode in the vicinity of a short side thereof and the other end side protrudes from one side edge of each of the second electrodes; one or plural sheets of separators having a rectangular shape, which are disposed between each of the first electrodes and each of the second electrodes, and have external dimensions larger than those of both the first electrodes and the second electrodes; and a nonaqueous electrolyte, wherein each of the first electrodes and each of the second electrodes are laminated with each of the separators interposed therebetween in such a manner that the second electrode leads and the first electrode leads are not opposite to each other, and therefore a laminated electrode body is obtained, in regard to the laminated electrode body, each of the second electrodes and each of the second electrode leads are connected to each other in such a manner that an electrode connection side one end, which is connected to one of the second electrodes, of each of the second electrode leads is located at a position that is opposite to either one of the first electrodes or one of the second electrodes, or a position that is opposite to neither the first electrodes nor the second electrodes, and the laminated electrode body is accommodated in a battery exterior body that covers and seals the laminated electrode body together with the nonaqueous electrolyte.

In addition, in the embodiments of the present disclosure, an edge of the second electrode connection side end portion of the second electrode lead may be subject to a chamfering process. In regard to this chamfering process, at least one of a C-chamfering or an R-chamfering may be performed. In addition, a shape of a main surface of at least the second electrode connection side end portion of the second electrode lead may have an R-shape or an obtuse angle. In addition, in the embodiments, for example, the first electrode and the second electrode may be a positive electrode and a negative electrode.

In addition, in the former embodiment of the present disclosure, the connection may be performed after adjusting a position of the end portion of the electrode lead provided at an outer circumference side of the wound electrode body, to a position that is opposite to either the first electrode or the second electrode, or a position that is opposite to neither the first electrode nor the second electrode. Therefore, it is difficult for stress to be applied to the end portion, to which stress is easily applied at the time of electrode expansion, of the electrode lead of the winding outer circumference side, such that it is possible to prevent the separator from being damaged.

In addition, in the latter embodiment of the present disclosure, the connection may be performed after adjusting a position of the end portion of each of the electrode leads that are connected to each of the negative electrodes making up the laminated electrode body, to a position that is opposite to either the first electrode or the second electrode, or a position that is opposite to neither the first electrode nor the second electrode. Therefore, it is difficult for stress to be applied to the end portion of each of the electrode leads at the time of electrode expansion, such that it is possible to prevent the separator from being damaged.

According to the embodiments of the present disclosure, the damage of the separation is suppressed, and a short circuit between the positive electrode and the negative electrode is suppressed, such that it is possible to realize a high level of safety.

Additional features and advantages are described herein, and will be apparent from the following Detailed Description and the figures.

DETAILED DESCRIPTION

Embodiments of the present application will be described below in detail with reference to the drawings. The description will be made in the following order.

1. First Embodiment (example in which adjustment in a position of an end portion of an electrode lead and a processing of an edge of an electrode lead are performed)
2. Second Embodiment (example in which the end portion of the electrode lead is coated)
3. Third Embodiment (example in which another electrode lead connection method is used)

1. First Embodiment 1-1. Entire Configuration of Nonaqueous Electrolyte Battery

Figure 1:
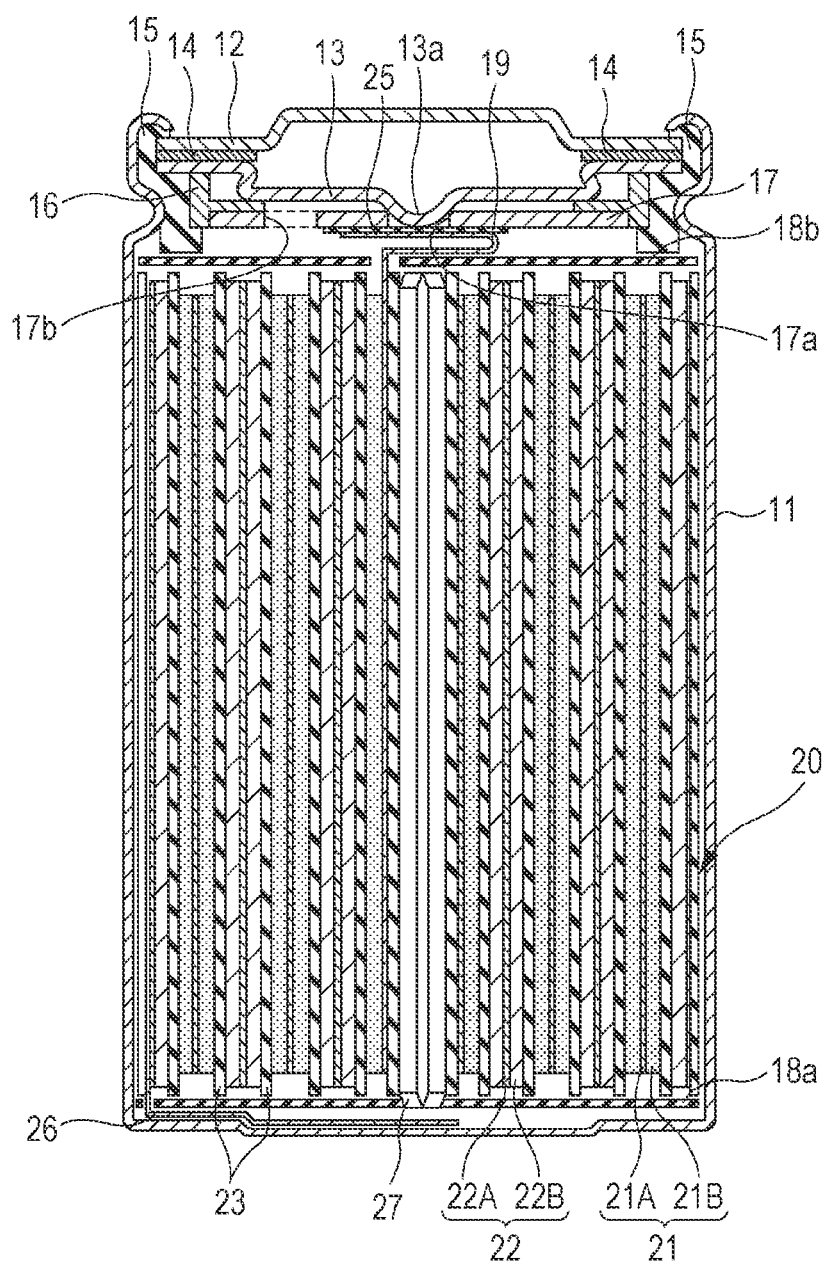
FIG. 1 is a cross-sectional view illustrating a first configuration example of a cylinder type nonaqueous electrolyte battery according to an embodiment of the present disclosure.

FIG. 1 shows a cross-sectional view of lithium ion secondary battery that is an example of a nonaqueous electrolyte battery 1 according to an embodiment of the present disclosure. This battery has a cylindrical shape, and includes a wound electrode body 20 formed by winding a strip-shaped positive electrode 21 and a strip-shaped negative electrode 22 with a separator 23 interposed between the positive electrode 21 and the negative electrode 22 together with a nonaqueous electrolytic solution (not shown), in a battery casing 11 having an approximately hollow column shape. The battery casing 11 is formed of, for example, nickel-plated steel, and one end portion of the battery casing 11 is closed, and the other end portion is opened. In the inside of the battery casing 11, a pair of insulating plates 18a and 18b is disposed to be orthogonal to a winding circumferential surface such that a wound electrode body 20 is interposed between the insulating plates 18a and 18b.

As a material of the battery casing 11, iron (Fe), Nickel (Ni), stainless steel (SUS), aluminum (Al), titanium (Ti), or the like may be exemplified. For preventing the battery casing 11 from being corroded due to an electrochemically nonaqueous electrolytic solution along with a charge and discharge of a battery, for example, nickel or the like may be plated on the battery casing 11. At the opened end portion of the battery casing 11, a battery lid 12 that is a positive electrode lead plate, a safety valve mechanism and a PTC (Positive Temperature Coefficient) element 14 provided at an inner side of the battery lid 12 are mounted in such a manner that they are caulked through an insulating sealing gasket 15.

The battery lid 12 is formed of, for example, the same material as that of the battery casing 11, and has an opening portion through which gas generated inside the battery is discharged. In the safety valve mechanism, a safety valve 13, a disc holder 16, and a shielding disc 17 overlap with each other in this order. A protruding portion 13a of the safety valve 13 is connected to a positive electrode lead 25 protruded from the wound electrode body 20 through a sub-disc 19 disposed to cover a hole portion 17a formed at a central portion of the shielding disc 17. When the safety valve 13 and the positive electrode lead 25 are connected to each other through the sub-disc 19, it is possible to prevent the positive electrode lead 25 from being drawn from the hole portion 17a at the time of reversion of the safety valve 13. In addition, the safety valve mechanism is electrically connected to the battery lid 12 through the PTC element 14.

In the safety valve mechanism, when a battery inner pressure becomes a predetermined value or more due to a battery inner short circuit or a heating from the outside of the battery, the safety valve 13 is reversed, and thereby the protruding portion 13a, the battery lid 12, and the wound electrode body 20 are electrically disconnected. That is, when the safety valve 13 is reversed, the positive electrode lead 25 is pressed by the shielding disc 17, such that a connection between the safety valve 13 and the positive electrode lead 25 is released. The disc holder 16 is formed of an insulating material, and when the safety valve 13 is reversed, the safety valve 13 and the shielding disc 17 are insulated.

In addition, in a case where gas is also generated inside the battery, and thereby the battery internal pressure is further increased, a part of the safety valve 13 is broken up and the gas is discharged to the battery lid 12 side.

In addition, for example, a plurality of gas discharge holes 17b is provided at the periphery of the hole portion 17a of the shielding disc 17, such that in a case where gas is generated from the wound electrode body 20, the gas is effectively discharged to the battery lid 12 side.

When a temperature is raised, a resistance value of the PTC element 14 increases, and thereby the battery lid 12 and the wound electrode body 20 are electrically disconnected. Therefore, current is blocked and thereby abnormal heat generation due to an excessive current is prevented. The insulating sealing gasket 15 is formed of, for example, an insulating material and asphalt is applied on a surface of the insulating sealing gasket 15.

The wound electrode body 20 accommodated in the nonaqueous electrolyte battery is wound about a center pin 27. The positive electrode lead 25 and a negative electrode lead 26 are connected to the positive electrode 21 and the negative electrode 22 of the wound electrode body 20, respectively. The positive electrode lead 25 is welded to the safety valve 13 and is electrically connected to the battery lid 12, and the negative electrode lead 26 is welded to the battery casing 11 and is electrically connected to the battery casing 11.

1-2. Connection Position of Electrode Lead in Laminated Electrode Body

When a connection position of the electrode lead in the laminated electrode body is described, configurations of the positive electrode 21, the negative electrode 22, and the separator 23 that make up the laminated electrode body will be described.

Positive Electrode

Figure 2A:
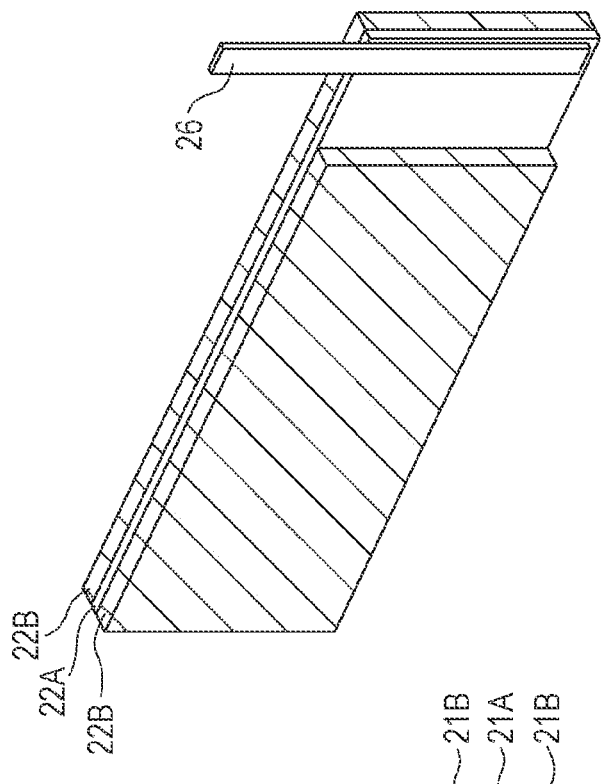
FIGS. 2A and 2B are perspective views illustrating a first configuration example of a positive electrode and a negative electrode that are used in a cylinder type nonaqueous electrolyte battery according to an embodiment of the present disclosure.

As shown in FIG. 2A, in the positive electrode 21, a positive electrode active material layer 21B is formed on both surfaces of a positive electrode current collector 21A having a strip shape, respectively. The positive electrode current collector 21A is formed of, for example, metallic foil having a thickness of 5 to 50 µm such as aluminum (Al) foil, nickel (Ni) foil, and stainless steel (SUS) foil. A part of the positive electrode current collector 21A is exposed, and the positive electrode lead 25 formed of a metallic material such as aluminum (Al) is connected to the exposed portion of the positive electrode current collector 21A, as described below.

The positive electrode lead 25 is connected to the positive electrode current collector 21A through, for example, an ultrasonic welding, a resistance welding, or the like. In addition, a material of the positive electrode lead 25 is not limited to the metallic material, and an arbitrary material may be used as long as the material is capable of realizing conduction between the positive electrode 21 and the battery lid 12 and is stable inside the battery. In addition, it is preferable that Vickers hardness Hv of the positive electrode lead 25 be within a range of 40 to 200. When the Vickers hardness Hv is set within such a range, a lead body has an appropriate hardness, and handleability is improved. In addition, since the Vickers hardness Hv is not too high, generation of a short circuit becomes difficult.

Negative Electrode

Figure 2B:
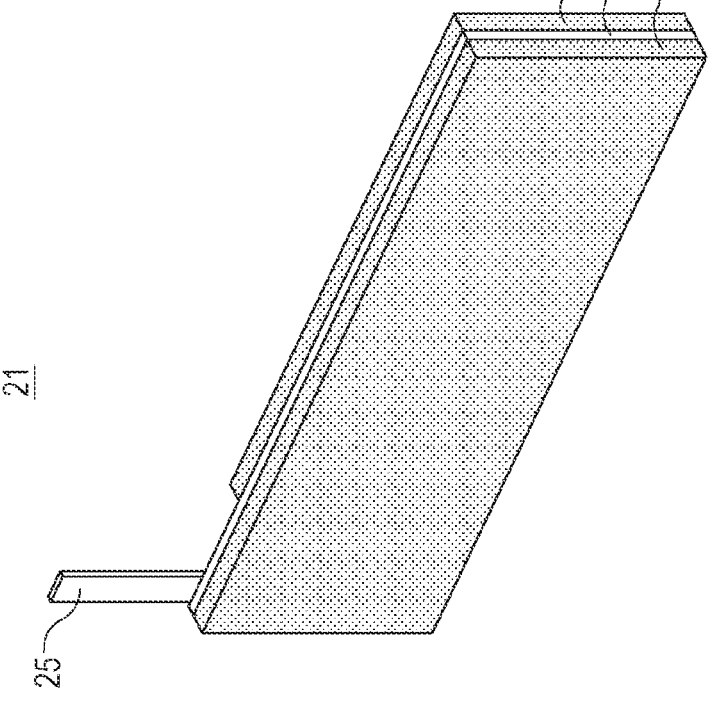

As shown in FIG. 2B, in the negative electrode 22, a negative electrode active material layer 22B is formed on both surfaces of the negative electrode current collector 22A having a strip shape, respectively. The negative electrode current collector 22A is formed of metallic foil such as copper foil, nickel foil, and stainless steel foil. A thickness of the negative electrode current collector 22A is, for example, 5 to 50 μm. A part of the negative electrode current collector 22A is exposed, and the negative electrode lead 26 formed of a metallic material such as Nickel (Ni) is connected to the exposed portion of the negative electrode current collector 22A, as described below. The negative electrode lead 26 is connected to the negative electrode current collector 22A through, for example, an ultrasonic welding, a resistance welding, or the like. A material of the negative electrode lead 26 is not limited to the metallic material, and an arbitrary material may be used as long as the material is capable of realizing conduction between the negative electrode 22 and the battery casing 11 and is stable inside the battery. In addition, it is preferable that Vickers hardness Hv of the negative electrode lead 26 be within a range of 40 to 200. When the Vickers hardness Hv is set within such a range, a lead body has an appropriate hardness, and handleability is improved. In addition, since the Vickers hardness Hv is not too high, generation of short circuit becomes difficult.

In addition, in an embodiment of the present disclosure, as shown in FIG. 1, the description will made with reference to a configuration in which a width in a lateral direction of the negative electrode 22 is larger than that of the positive electrode 21, and both surfaces of the negative electrode 22 in a longitudinal direction is located at an external side in a wound electrode plane in relation to the both surfaces of the positive electrode 21 in a longitudinal direction.

Separator

The separator 23 insulates the positive electrode 21 and the negative electrode 22. The separator 23 has minute holes, and thereby maintains a nonaqueous electrolyte and allows ions to pass therethrough along with the charge and discharge. The separator 23 has the sizes in a longitudinal direction and a lateral direction, which are larger than those of the positive electrode 21 and the negative electrode 22 in a longitudinal direction and a lateral direction. Therefore, the positive electrode 21 and the negative electrode 22 are insulated.

Laminated Electrode Body

Figure 3:
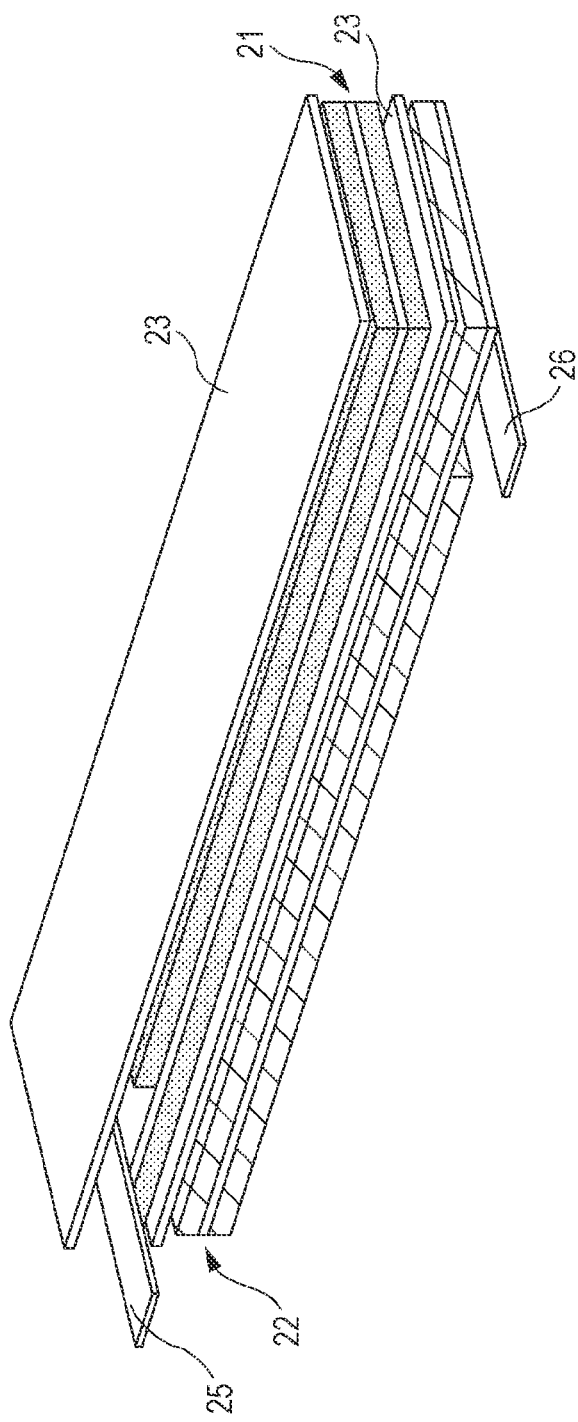
FIG. 3 is a perspective view illustrating a first configuration example of a laminated electrode body that is used in a cylinder type nonaqueous electrolyte battery according to an embodiment of the present disclosure.

As described in FIG. 3, the positive electrode 21 and the negative electrode 22 described above make up a laminated electrode body 24 in which the positive electrode 21, the separator 23, the negative electrode 22, and the separator 23 are laminated in this order. In the laminated electrode body 24, one of the positive electrode active material layers 21B and one of the negative electrode active material layers 22B are opposite to each other with the separator 23 interposed therebetween. In the first embodiment, an end portion, to which the positive electrode lead 25 of a left side in FIG. 3 is connected, of the laminated electrode body 24 is set as a winding initial end portion, and an end portion, to which the negative electrode lead 26 of a right side in FIG. 3 is connected, of the laminated electrode body 24 is set as a winding distal end portion. In this state, the laminated electrode body 24 is wound in the longitudinal direction and forms the wound electrode body 20. In the wound electrode body 20, the positive electrode lead 25 is located at a winding inner circumference side (winding central portion) and the negative electrode lead 26 is located at a winding outer circumference side. The outermost circumference of the winding electrode body 20 is wound in such a manner that the exposed portion of the negative electrode current collector is located at a position being once around or more toward the outermost circumference side of the battery.

The positive electrode lead 25 is connected to the safety valve 13 whose one end end portion is electrically connected to the battery lid 12. Therefore, the positive electrode lead 25 is connected to the positive electrode 21 in such a manner that one end portion thereof protrudes from the laminated electrode body 24. Similarly, the one end portion of the negative electrode lead 26 is connected to the battery casing 11. Therefore, the negative electrode lead 26 is connected to the negative electrode 22 in such a manner that the one end portion thereof protrudes from the laminated electrode body 24.

The negative electrode lead 26 connected to the outer circumference side of the winding electrode body 20 is affected by expansion and contraction of the positive electrode active material layer 21B and the negative electrode active material layer 22B accompanied with the charge and discharge. Therefore, in this embodiment of the present disclosure, the connection position of the negative electrode lead 26 with respect to the negative electrode 22 is adjusted, and thereby damage in the separator 23, which is caused by the negative electrode lead 26, is suppressed.

Figure 4A:
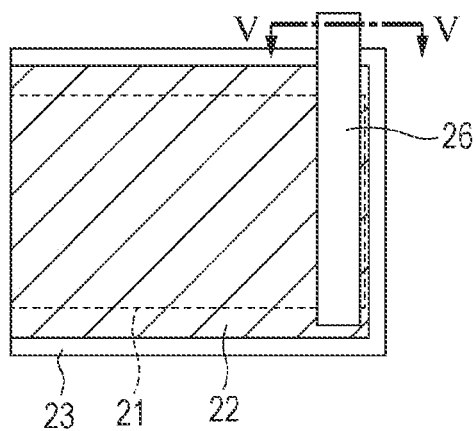
FIGS. 4A and 4B are schematic diagrams illustrating a connection position of a negative electrode and a negative electrode lead according to an embodiment of the present disclosure.
Figure 4B:
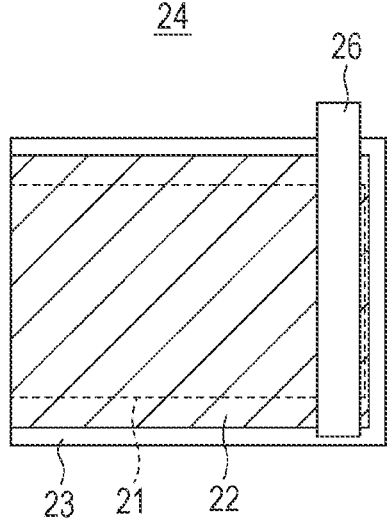

FIGS. 4A and 4B illustrate a connection position of the negative electrode lead 26 at a winding distal end portion of the laminated electrode body 24. In addition, FIGS. 4A and 4B illustrate a state seen from a bottom surface in FIG. 3, that is, a surface onto which the negative electrode lead 26 of the negative electrode 22 is connected. The positive electrode 21 has a size smaller than that of both of the negative electrode 22 and the separator 23, such that the positive electrode 21 is designated by a dotted line.

As shown in FIGS. 4A and 4B, the negative electrode lead 26 is connected in such a manner that the battery casing 11 connection side one end of the negative electrode lead 26 protrudes from the negative electrode 22. In addition, the negative electrode lead 26 is connected in such a manner that the other end (hereinafter, appropriately referred to as electrode connection side one end) of the negative electrode lead 26 other than the battery casing 11 connection side one end is connected to the negative electrode 22 at a position where the electrode connection side one end is not interposed between a main surface of the positive electrode 21 and a main surface of the negative electrode 22. Specifically, the negative electrode lead 26 is connected to the negative electrode 22 in such a manner that the same position as that of an end portion of the positive electrode 21 in the lateral direction of the laminated electrode body 24 (in the height direction of the wound electrode body 20) is located at an external side in relation to an end portion of the positive electrode 21.

FIG. 4A illustrates an example in which the negative electrode lead 26 is provided in such a manner that the electrode connection side one end of the negative electrode lead 26 is located to be opposite to only the negative electrode 22 out of the positive electrode 21 and the negative electrode 22. In addition, FIG. 4B illustrates an example in which the negative electrode lead 26 is provided in such a manner that the electrode connection side one end of the negative electrode lead 26 is located to be opposite to the only the separator 23 without being opposite to the positive electrode 21 or the negative electrode 22. In this manner, the electrode connection side one end of the negative electrode lead 26 is located at a portion where clearance corresponding to one sheet or the sheets of electrode occurs compared to a position that is opposite to the positive electrode 21 and the negative electrode 22, such that it is difficult for a large pressure to be applied at the time of electrode expansion.

In addition, in regard to the negative electrode lead 26, it is preferable that the electrode connection side one end of the negative electrode lead 26 be located at the same position as that of an end portion of the separator 23 in the lateral direction of the laminated electrode body 24, or be located at an internal side in relation to the end portion of the separator 23, and it is preferable that the electrode connection side one end of the negative electrode lead 26 be located at the same position as that of an end portion of the negative electrode 22 in the lateral direction or be located at an internal side in relation to the end portion of the negative electrode 22. That is, as shown in FIG. 4B, in the lateral direction of the laminated electrode body 24, it is preferable that the electrode connection side one end of the negative electrode lead 26 be located between an end portion of the positive electrode 21 and an end portion of the separator 23. In addition, as shown in FIG. 4A, in the lateral direction of the laminated electrode body 24, it is preferable that the electrode connection side one end of the negative electrode lead 26 be located between an end portion of the positive electrode 21 and an end of the negative electrode 22.

This is because that the electrode connection side one end of the negative electrode lead 26 that easily causes damage to the separator 23 is located at a portion that becomes thinner by at least a thickness of the positive electrode 21. That is, in a case where the electrode connection side one end of the negative electrode lead 26 is located at an external side in relation to the end portion of the positive electrode 21, it is difficult for a large force to be applied to the electrode connection side one end, compared to a case where the electrode connection side one end of the negative electrode lead 26 is located over the main surface of the positive electrode 21. Therefore, the damage of the separator 23 is suppressed. In addition, in a case where the electrode connection side one end of the negative electrode lead 26 is located between the end portion of the negative electrode 22 and the end portion of the separator 23, the negative electrode lead 26 is long, such that it is undeniable that the electrode connection side one end of the negative electrode lead 26 is wrapped around and is short circuited with the positive electrode 21. Therefore, it is preferable that the electrode connection side one end of the negative electrode lead 26 be located between the end portion of the positive electrode 21 and the end portion of the negative electrode 22.

The negative electrode lead 26 is formed by cutting a metallic plate. Therefore, four edges surrounding one side main surface and four edges surround the other side main surface become sharp with an approximately right angle. Stress may be easily focused on these edges due to the expansion of the positive electrode 21 and the negative electrode 22, such that the edges may easily cause damage to the separator 23. Therefore, in regard to the negative electrode lead 26, it is preferable that the edges in the vicinity of the electrode connection side end portion including at least the electrode connection side one end be subjected to a chamfering process to have an obtuse angle. Particularly, in a case where a burr is formed on the end portion (cut-plane) of the negative electrode lead 26, it is necessary to remove at least the burr.

Figure 5A:
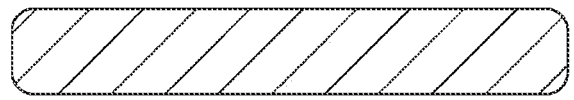
FIGS. 5A and 5B are cross-sectional views illustrating a first configuration example of a negative electrode lead according to an embodiment of the present disclosure.
Figure 5B:
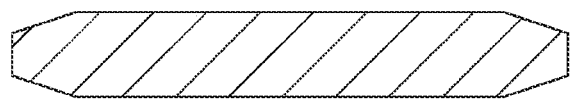

FIGS. 5A and 5B illustrates an example of a cross-section taken along lines VA-VA and VB-VB in FIG. 4A. As shown in FIG. 5A, in the negative electrode lead 26, for example, the edge portions are R-chamfered, and have an R-shape. In addition, as shown in FIG. 5B, in the negative electrode lead 26, the edge portions may be C-chamfered, and may have an obtuse angle shape. In addition, with respect to the edge portions of the negative electrode lead 26, both of the R chamfering and the C-chamfering may be performed.

Figure 6A:
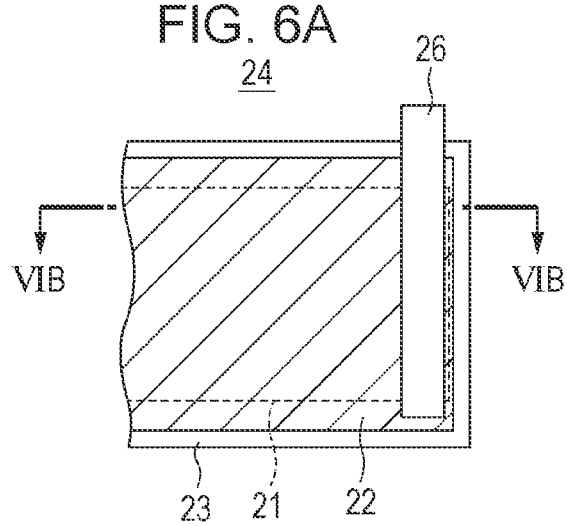
FIGS. 6A and 6B are cross-sectional views illustrating a first configuration example in a case where the negative electrode lead shown in FIGS. 5A and 5B is used according to an embodiment of the present disclosure.
Figure 6B:
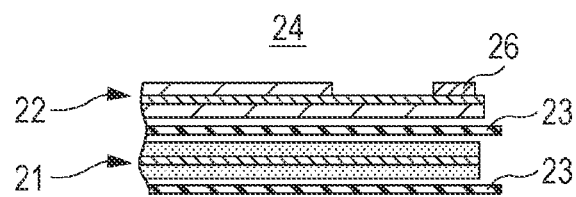

It is necessary that at least edges of a separator opposing side main surface of the negative electrode lead 26, which is opposite to the negative electrode current collector 22A side main surface, has the chamfered shape of the edges shown in FIGS. 5A and 5B. Therefore, as shown in FIGS. 6A and 6B, the edges of the negative electrode lead 26 that are opposite to the separator 23 become dull, such that it is difficult to cause damage to the separator 23. In addition, FIG. 6A shows a top view illustrating a winding distal end portion of the laminated electrode body 24 and a winding outer circumference side end portion of the winding electrode body 20. FIG. 6B shows a cross-sectional view taken along a VIB-VIB line of the laminated electrode body 24 shown in FIG. 6A. In addition, in FIG. 6A, a portion indicated by oblique lines represents the entirety of the negative electrode 22.

In addition, even though it is not shown in the drawings, it is preferable that edges of a short side of the electrode connection side one end of the negative electrode lead 26 also have the chamfered shape, similarly to this.

From a viewpoint of manufacturing, it is preferable that both of the edges of the negative electrode current collector 22A side main surface of the negative electrode lead 26, and the edges of the separator opposing side main surface have the chamfered shape. This is because that when the negative electrode lead 26 is connected to the negative electrode current collector 22A, it is possible to perform the connection irrespective of a front surface and a rear surface.

Figure 7A:
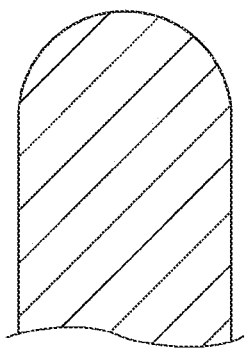
FIGS. 7A and 7B are cross-sectional views illustrating the first configuration example of a negative electrode lead according to an embodiment of the present disclosure.
Figure 7B:
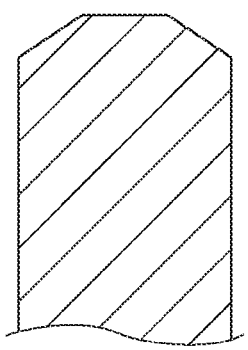

In addition, as shown in FIGS. 7A and 7B, at least the main surface of the electrode connection side one end of the negative electrode lead 26 may have a chamfered shape such as an R-shape or an obtuse angle shape. Therefore, it is possible to further suppress damage of the separator 23 caused by the edge of the negative electrode lead 26. In addition, both ends of the negative electrode lead 26 may have the R-shape or obtuse angle shape.

In addition, in a case where the electrode connection side one end of the negative electrode lead 26 is located at the same position as that of the end portion of the positive electrode 21, it is particularly preferable that the negative electrode lead 26 is subjected to the chamfering process. In this case, the effect of suppressing the damage of the separator 3 becomes significantly high.

Large stress is not applied to the positive electrode lead 25 located at an inner circumference side of the winding electrode body 20 in relation to the negative electrode lead 26, such that in regard to a central portion of the wound electrode body 20, it is less necessary to consider the damage of the separator 23 caused by the edge of the positive electrode lead 25. However, to avoid a problem that an electrode one end of the positive electrode lead 25 goes around the separator 23 and comes into contact with the negative electrode 22, or the like, it is preferable that the electrode connection side one end of the positive electrode lead 25 be located at the same position as that of the negative electrode lead 26. In addition, similarly to the negative electrode lead 26, edges of four sides surrounding a main surface of the positive electrode lead 25 and the electrode connection side one end of the positive electrode lead 25 may be processed to have a chamfered shape.

1-3. Configuration of Each Component of Battery

Positive Electrode

The positive electrode active material layer 21B contains, for example, one kind or two kinds or more of electrode materials capable of occluding and emitting lithium that is an electrode reaction material, as a positive electrode active material. The positive electrode active material layer 21B may contain a conducting agent such as a carbon material, and a binding agent such as polyvinylidene fluoride, according to necessity. As the positive electrode material capable of occluding and emitting lithium, for example, metallic sulfide, metallic selenide, or metallic sulfide, which does not contain lithium, such as titanium sulfide ($TiS_2$), molybdenum sulfide ($MoS_2$), niobium selenide ($NbSe_2$), vanadium oxide ($V_2O_5$), or a lithium-containing compound may be exemplified.

Among these, the lithium-containing compound is preferable, because high voltage and high energy density can be obtained. As such a lithium-containing compound, for example, a composite oxide containing lithium and a transition metal element, or a phosphate compound containing lithium and a transition metal element may be exemplified. Particularly, it is preferable to contain at least one kind of cobalt (Co), nickel (Ni), and manganese (Mn), because a relatively high voltage can be obtained. A chemical formula is expressed by $Li_xM1O_2$, or $Li_yM2PO_4$. In the chemical formula, M1 and M2 represent one kind or more of transition metal element. Values of x and y are different depending on a charge and discharge state, and commonly, $0.05 \leq x \leq 1.10$, $0.05 \leq y \leq 1.10$.

As a specific example of the composite oxide containing lithium and transition metal element, a lithium cobalt composite oxide ($Li_xCoO_2$), a lithium nickel composite oxide ($Li_xNiO_2$), a lithium nickel cobalt composite oxide ($Li_xNi_{1-a}Co_aO_2(0<a<1)$), a lithium manganese composite oxide ($LiMn_2O_4$) having a spinel type structure, or the like may be exemplified. Among these, a composite oxide containing nickel is preferable, because a high capacity can be obtained and an excellent cycle characteristic can be obtained. As a specific example of the phosphate compound including lithium and a transition metal element, for example, a lithium iron phosphate compound ($LiFePO_4$), or a lithium iron manganese phosphate compound ($LiFe_{1-b}Mn_bPO_4$ ($0<b<1$)) may be exemplified.

Negative Electrode

The negative electrode active material layer 22B contains, for example, a negative electrode active material, and may contain another material such as a conducting agent and a binding agent according to necessity. As the negative electrode active material, for example, a negative electrode active material that is capable of occluding and emitting lithium that is an electrode reaction material and that contains at least one kind in a metal element and a metalloid element as a metal element may be exemplified. It is preferable to use this negative electrode material, because a high energy density is obtained. This negative electrode material may be an elementary substance, an alloy, or a compound of a metal element or a metalloid element, or may be a material having at least partially one kind or two kinds of phases of these. In addition, in this embodiment of the present disclosure, the alloy includes an alloy containing one kind or more of metal elements and one kind or more of metalloid elements, in addition to an alloy formed of two kinds of metal elements. In addition, a non-metal element may be contained. In a structure of the negative electrode material, a solid solution, eutectic (eutectic mixture), an intermetallic compound, or two kinds or more thereof may coexist.

As the metal element or metalloid element that makes up the negative electrode material, for example, a metal element or metalloid element that can form an alloy together with lithium may be exemplified. Specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), or platinum (Pt), or the like may be exemplified.

Among these, as the negative electrode material, it is preferable to contain a metal element or a metalloid element of group 14 in an extended periodic table as a constituent element, and is particularly preferable to contain at least one side of silicon and tin as the constituent element. This is because that silicon and tin have a large capability of occluding and emitting lithium and a high energy density can be obtained. Specifically, for example, an elementary substance, an alloy or a compound of silicon, an elopement substance, an alloy or a compound of tin, or a material having at least partially one kind or two kinds or more of phases of these may be exemplified.

As an alloy of tin, for example, an alloy containing at least one kind selected from a group consisting of silicon, nickel, copper, iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than tin may be exemplified. As an alloy of silicon, for example, an alloy containing at least one kind selected from a group consisting of tin, nickel, copper, iron, cobalt, manganese, zinc, indium, silver, titanium, germanium, bismuth, antimony, and chromium as a second constituent element other than silicon may be exemplified.

As a compound of tin or a compound of silicon, for example, a compound containing oxygen (O) or carbon (C) may be exemplified. In addition to tin or silicon, the above-described second element may be contained.

Among these, as a negative electrode material, SnCoC-containing material in which tin, cobalt, and carbon are contained as a constituent element, the content of carbon is 9.9 to 29.7 mass %, and a ratio of cobalt to the sum of tin and cobalt which is 30 to 70 mass % is preferable. This is because that within this composition range, a high energy density is obtained, and an excellent cycle characteristic is obtained.

This SnCoC-containing material may further contain another constituent element according to necessity. As another constituent element, for example, silicon, iron, nickel, chromium, indium, niobium (Nb), germanium, titanium, molybdenum (Mo), aluminum (Al), phosphorus (P), gallium (Ga), or bismuth (Bi) is preferable, and two kinds or more thereof may be contained. This is because that the capacity or cycle characteristic may be further improved.

In addition, this SnCoC-containing material has a phase including tin, cobalt, and carbon, and it is preferable that this phase have a low crystalline structure, or an amorphous structure. In addition, in the SnCoC-containing material, it is preferable that at least part of carbon that is a constituent element be coupled to a metal element or a metalloid element that is another constituent element. This is because that a decrease in the cycle characteristic is considered to be because tin or the like is aggregated or crystallized, but when carbon is coupled to another element, it is possible to suppress such aggregation or crystallization.

As the negative electrode active material, a carbon material such as natural graphite, artificial graphite, non-graphitization carbon, and easy-graphitization carbon may be used. It is preferable to use the carbon material because an excellent cycle characteristic can be obtained. In addition, as the negative electrode active material, lithium metal may be further exemplified. As the negative electrode active material, one kind of the above-described materials may be used alone, or may be used in a state where two kinds or more are mixed.

In addition, in this embodiment of the present disclosure, when the negative electrode 22 using an alloy-based negative electrode material having a large expansion and contraction accompanied with the charge and discharge is used, it is possible to obtain a relatively high effect of suppressing the damage of the separator.

Separator

The separator 23 is configured by, for example, a porous film formed of a polyolefin-based material such as polypropylene and polyethylene, or a porous film formed of an inorganic material such as a ceramic non-woven fabric, and may have a structure in which two kinds or more of these films are laminated. In addition, a surface layer containing inorganic particles may be provided on a surface of the above-described porous film for the purpose of improving a heat resistance and an oxidation resistance of the separator 23.

Nonaqueous Electrolytic Solution

A nonaqueous electrolytic solution that is a liquid electrolyte is impregnated in the separator 23. This nonaqueous electrolyte includes, for example, a solvent, and lithium salt that is electrolyte salt. The solvent dissolves and dissociates the electrolyte salt. As the solvent, propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methyl sulfolane, acetonitrile, propionitrile, anisole, acetate ester, butyrate ester, propionate ester, or the like may be exemplified, and one kind or two kinds or more thereof may be mixed and used.

As the electrolyte salt, for example, lithium perchlorate ($LiClO_4$), lithium hexafluoroarsenate ($LiAsF_6$), lithium hexafluorophosphate ($LiPF_6$), lithium tetrafluoroborate ($LiBF_4$), lithium tetrapenylborate ($LiB(C_6H_5)_4$), lithium methanesulfonate ($CH_3SO_3Li$), lithium trifluoromethanesulfonate ($LiCF_3SO_3$), lithium chloride (LiCl), lithium boride (LiBr), lithium tris(trifluoromethanesulfonyl)methide ($LiC(CF_3SO_2)_3$), lithium bis(oxalate)borate ($LiB(C_2O_4)_2$), or the like may be exemplified. One kind or two kinds or more thereof may be mixed and used. Among these, when lithium hexafluorophosphate ($LiPF_6$) and lithium bis(oxalate)borate ($LiB(C_2O_4)_2$) are mixed and used, a relatively high characteristic can be obtained, such that this is preferable.

1-4. Method of Manufacturing Nonaqueous Electrolyte Battery

This nonaqueous electrolyte battery 1 can be manufactured as described below, for example.

Manufacturing of Positive Electrode

A positive electrode active material and a conducting agent are mixed together with a binding agent to produce a positive electrode mixture. This positive electrode mixture is dispersed in a solvent such as N-methyl-2-pyrrolidone, and thereby a positive electrode mixture slurry having a paste phase is obtained. Subsequently, this positive electrode mixture slurry is uniformly applied to the positive electrode current collector 21A by using a doctor blade, a bar coater, or the like, and then the positive electrode current collector 21A is dried to evaporate the solvent. Then, the positive electrode current collector 21A is compression-molded by a roll pressing machining or the like and thereby the positive electrode active material layer 21B is formed. Finally, the positive electrode lead 25 is attached to an exposed portion of the positive electrode current collector 21A through a welding or the like and thereby the positive electrode 21 is obtained. The roll pressing machine may be used in a heated state. In addition, the compression-molding may be performed in plural times to obtain a desired physical property. Furthermore, a pressing machine other than the roll pressing machine may be used.

At this time, it is preferable that the positive electrode lead 25 be connected to a position described in the item (1-2). In addition, preferably, the positive electrode lead 25 in which edges are processed to have a chamfered shape as shown in FIGS. 5A and 5B, the positive electrode lead 25 in which the electrode connection side one end is processed to have a shape as shown in FIGS. 7A and 7B, and the positive electrode lead 25 that has a cross-sectional shape and a main surface shape as shown in FIGS. 5A and 5B, and FIGS. 7A and 7B.

Negative Electrode

A negative electrode active material and a conducting agent are mixed together with a binding agent to produce a negative electrode mixture. This negative electrode mixture is dispersed in a solvent such as N-methyl-2-pyrrolidone, and thereby negative electrode mixture slurry having a paste phase is obtained. Subsequently, this negative electrode mixture slurry is uniformly applied to the negative electrode current collector 22A by using a doctor blade, a bar coater, or the like, and then the negative electrode current collector 22A is dried to evaporate the solvent. Then, the negative electrode current collector 22A is compression-molded by a roll pressing machining or the like and thereby the negative electrode active material layer 22B is formed. Finally, the negative electrode lead 26 is attached to an exposed portion of the negative electrode current collector 22A through a welding or the like and thereby the negative electrode 22 is obtained.

In addition, in the case of using a metal-based negative electrode active material or an alloy-based negative electrode active material, for example, a gas phase method, a liquid phase method, a thermal spraying method, or a baking method other than the above-described application method may be used. In addition, in the case of using such method where two kinds or more are used, it is preferable that at least part of an interface between the negative electrode current collector 22A and the negative electrode active material layer 22B be alloyed. Specifically, it is preferable that in the interface, constituent elements of the negative electrode current collector 22A diffuse into the negative electrode active material layer 22B, constituent elements of the negative electrode active material layer 22B diffuse into the negative electrode current collector 22A, or such constituent elements diffuse into each other. This is because that in this case, it is possible to suppress damage of the negative electrode active material layer 22B due to expansion and contraction accompanied with the charge and discharge, and it is possible to improve electron conductivity between the negative electrode active material layer 22B and the negative electrode current collector 22A.

In addition, as the gas phase method, for example, a physical deposition method or a chemical deposition method, specifically, a vacuum deposition method, a sputtering method, an ion plating method, a laser ablation method, a thermal chemical vapor deposition (CVD) method, a plasma chemical vapor deposition method, or the like may be exemplified. As the liquid phase method, an electroplating, an electroless-plating, or the like existing in the related art may be used. The baking method is a method in which a particulate negative electrode active material is mixed with a binding agent or the like, the mixture is dispersed in a solvent, the dispersed material is applied, and then a heat treatment at a temperature higher than that of the binding agent or the like is performed. In regard to the baking method, an existing method may be used, for example, an atmospheric baking method, a reaction baking method, a hot press baking method, or the like may be exemplified.

At this time, the negative electrode lead 26 is connected to a position described in the item (1-2). In addition, preferably, the negative electrode lead 26 in which edges are processed to have a chamfered shape as shown in FIGS. 5A and 5B, the negative electrode lead 26 in which the electrode connection side one end is processed to have a shape as shown in FIGS. 7A and 7B, and the negative electrode lead 26 that has a cross-sectional shape and a main surface shape as shown in FIGS. 5A and 5B, and FIGS. 7A and 7B.

Manufacturing of Center Pin

A center pin material having a thin plate shape is prepared, and this center pin material is cut to have a desired size through, for example, a press working Subsequently, the center pin material that is cut is wound to have a cylindrical shape, both ends thereof are tapered to provide a tapered portion, and thereby a center pin 27 is formed.

Assembling of Nonaqueous Electrolyte Battery

The positive electrode 21 and the negative electrode 22 are laminated with the separator 23 interposed therebetween and thereby the laminated electrode body 24 is formed. The laminated electrode body 24 is wound and thereby the wound electrode body 20 is manufactured. Next, the center pin 27 is inserted into the wound electrode body 20 at the center thereof. Next, the wound electrode body 20 is interposed between the pair of insulating plates 18 and 19, the negative electrode lead 26 is welded to the bottom portion of the battery casing 11, and the positive electrode lead 25 is welded to the protruding portion 13a of the safety valve 13. Next, the wound electrode body 20 is accommodated inside the battery casing 11, and the nonaqueous electrolytic solution is injected into the inside of the battery casing 11 and is impregnated in the separator 23. Finally, the battery lid 12, a safety valve mechanism such as the safety valve 13, and the PTC element 14 are caulked to an opening portion of the battery casing 11 through the insulating sealing gasket 15. Therefore, the nonaqueous electrolyte battery 1 shown in FIG. 1 is completed.

In the nonaqueous electrolyte battery 1, when a charge is performed, for example, lithium ions are emitted from the positive electrode 21 and are occluded in the negative electrode 22 through the nonaqueous electrolytic solution impregnated in the separator 23. When a discharge is performed, for example, the lithium ions is emitted from the negative electrode 22, and are occluded in the positive electrode 21 through the nonaqueous electrolyte impregnated in the separator 23.

Effect

In the nonaqueous electrolyte battery 1, even at the time of electrode expansion, it is difficult for a large pressure to be applied in the vicinity of the electrode connection side end portion including the electrode connection side one end of the negative electrode lead 26. Therefore, damage of the separator 23 is suppressed, and thereby a short circuit between the positive and negative electrodes is suppressed. Particularly, in a case where the negative electrode 22 can occlude and emit an electrode reaction material, and is made to include a negative electrode active material including at least one kind in a metal element and a metalloid element, the expansion of the negative electrode 22 becomes large, an energy density becomes large, and a relative high level of safety is obtained. Therefore, it is possible to obtain a relatively high effect.

2. Second Embodiment

In this second embodiment, an example where the electrode connection side end portion of the negative electrode lead 26 is subjected to an insulation treatment will be described. In addition, the second embodiment has the same configuration as that of the first embodiment except for the insulation treatment of the negative electrode lead 26 and a connection position of the negative electrode lead 26, such that the description will be given with respect to portions different from the first embodiment.

In addition, similarly to the first embodiment, in the second embodiment, a width of the negative electrode 22 in the lateral direction is larger than that of the positive electrode 21 in the lateral direction, and both surfaces of the negative electrode 22 in the longitudinal direction are located at an external side in the wound electrode surface in relation to both surfaces of the positive electrode 21 in the longitudinal direction. In addition, the separator 23 has sizes in the longitudinal direction and the lateral direction, which are larger than those of the positive electrode 21 and the negative electrode 22 in both the longitudinal direction and the lateral direction.

Insulation Treatment and Connection Position of Negative Electrode Lead

Figure 8:
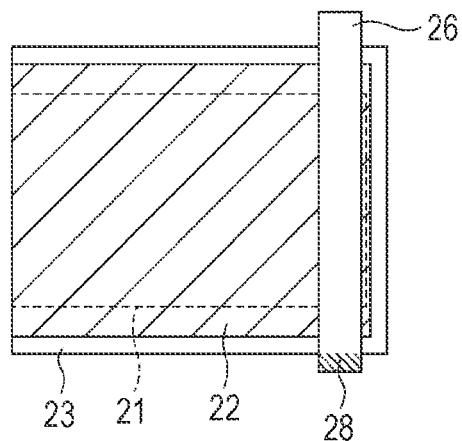
FIG. 8 is a cross-sectional view illustrating a first configuration example of a negative electrode lead according to an embodiment of the present disclosure.

FIG. 8 illustrates an example of a connection position of the negative electrode lead 26 in the winding distal end of the laminated electrode body 24 according to the second embodiment. In the second embodiment, in a case where the electrode connection side one end of the negative electrode lead 26 is located at an external side in relation to an end portion of the separator 23, the electrode connection side one end of the negative electrode lead 26 is subject to an insulation treatment. Specifically, as shown in FIG. 8, a region, which protrudes from the end portion of the separator 23, of the negative electrode lead 26 is configured by an insulated portion 28 indicated by thin oblique lines.

The portion, which protrudes from the end portion of the separator 23 to the outside, of the negative electrode lead 26 may come into contact with the positive electrode 21. When the portion, which protrudes from the end portion of the separator 23 to the outside, of the negative electrode lead 26 is subjected to the insulation treatment, even when the negative electrode lead 26 and the positive electrode 21 come into contact with each other, a short circuit does not occur.

In addition, this insulation treatment may be performed with respect to a portion, which protrudes from an end portion of the negative electrode 22 to the outside, of the negative electrode lead 26. In addition, the position of the end portion of the negative electrode lead 26 shown in FIG. 8 is illustrative only, and the negative electrode lead 26 in which the periphery of the electrode connection side end portion including the electrode connection side one end is subjected to the insulation treatment may be connected to the same position as that in the first embodiment. In this case, the insulation treatment region of the negative electrode current collector 22A and the negative electrode lead 26 are not connected to each other through an ultrasonic welding or the like that is generally used, but when the negative electrode current collector 22A and a portion of the negative electrode lead 26 except for the insulation treatment region, it is possible to sufficiently extract a current.

The insulation treatment with respect to the negative electrode lead 26 is performed through a method in which a predetermined region of the negative electrode lead 26 is coated with a resin material, or a method in which an anodization is performed and thereby an anodic oxide film is formed. As the resin material coated onto the predetermined region of the negative electrode lead 26, a resin having a high bonding property with metal is preferable, and for example, polyethylene (PE), polypropylene (PP), a polyolefin resin such as modified polyethylene and modified polypropylene that are modified from the polyethylene and the polypropylene, polyethylene terephthalate (PET), polyimide (PI), polyphenylene sulfide (PPS), or the like may be exemplified. In regard to the resin material, it is preferable that a film-shaped resin piece be bonded to a predetermined region of the negative electrode lead 26, or a melted resin material be applied to the predetermined region of the negative electrode lead 26.

In addition, as the resin material coated onto the predetermined region of the negative electrode lead 26, a protective tape may be used, which has an adhesive layer and a resin material, as a main component, such as polyethylene (PE), polypropylene (PP), a polyolefin resin such as modified polyethylene and modified polypropylene that are modified from the polyethylene and the polypropylene, polyethylene terephthalate (PET), polyimide (PI), and polyphenylene sulfide (PPS).

In addition, the insulation treatment may be performed with respect to the positive electrode lead 25.

Shape of Negative Electrode Lead

It is preferable that the negative electrode lead 26 have an R-shape obtained by performing an R-chamfering or an obtuse shape obtained by a C-chamfering. In addition, similarly to the first embodiment, a shape of the main surface of the electrode connection side one end of the negative electrode lead 26 may have the R-shape obtained by performing the R-chamfering or the obtuse shape obtained by the C-chamfering. The above-described insulation treatment is performed after chamfering process with respect to the edges of the negative electrode lead 26. Therefore, it is possible to further suppress a short circuit of the positive electrode 21 and the negative electrode lead 26.

Effect

According to this method, it is possible to prevent short circuit between the end portion of the negative electrode lead 26 and the positive electrode 21. When adjustment on the connection position of the negative electrode lead 26, the chamfering of the edges, or the like in regard to the first embodiment are combined, it is possible to further suppress damage of the separator 23, and thereby it is possible to obtain a relatively high level of safety.

3. Third Embodiment

In this third embodiment, an example where a caulking method is used as a method of connecting the negative electrode lead to the negative electrode will be described. In addition, the third embodiment has the same configuration as that of the first embodiment except for the negative electrode to which the negative electrode lead is connected, such that only the negative electrode will described.

3-1. Configuration of Negative Electrode

Figure 9:
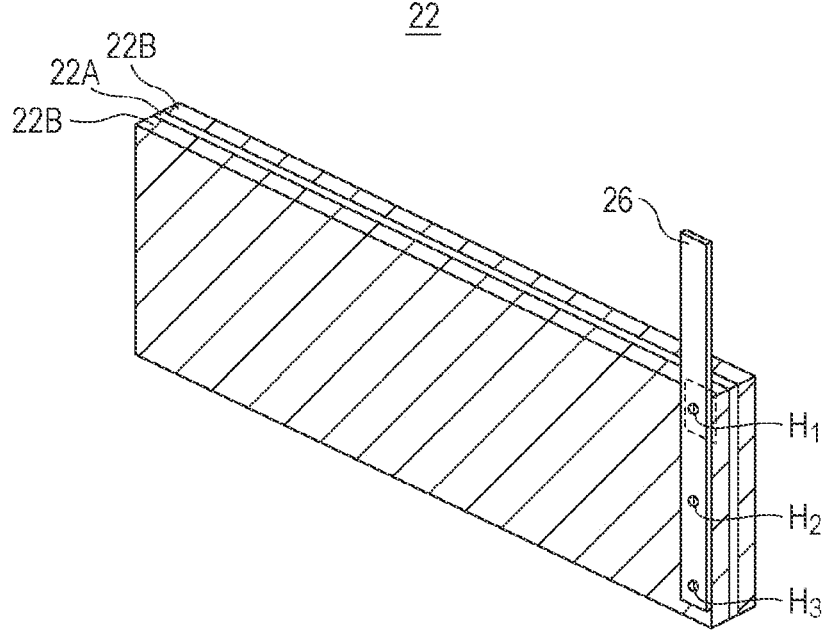
FIG. 9 is a perspective view illustrating another connection method of a negative electrode and a negative electrode lead according to an embodiment of the present disclosure.

FIG. 9 illustrates a negative electrode 22 used in the third embodiment. In the negative electrode 22 according to the third embodiment, a negative electrode active material layer 22B is formed on negative electrode current collector 22A similarly to the first embodiment. A negative electrode lead 26 is connected to the negative electrode 22 through a caulking method. When the connection method of the negative electrode lead 26 through the caulking method is used, the negative electrode lead 26 can be connected to the negative electrode 22 on the negative electrode active material layer 22B. The negative electrode 22 and the negative electrode lead 26 have punched holes H formed by the caulking. In FIG. 9, the connection is performed at three places by the caulking, such that three punched holes $H_1$, $H_2$, and $H_3$ are formed.

The same material as that in the first embodiment may be used as a material of the negative electrode current collector 22A in the third embodiment. Particularly, as a metallic material making up the negative electrode current collector 22A, a material containing one kind or two kinds or more of metal elements that do not form an intermetallic oxide with the negative electrode active material is preferably used. When the intermetallic oxide is formed between the metallic material and negative electrode active material, the negative electrode current collector 22A is easily affected by stress due to expansion and contraction of the negative electrode active material layer 22B, such that there is a possibility in that a current collecting property is decreased, or the negative electrode active material layer 22B is peeled off.

In addition, as the metallic material, a material containing one kind or two kinds of metal elements that are alloyed with the negative electrode active material layer 22B is preferable. This is because that an adhesion property between the negative electrode current collector 22A and the negative electrode active material layer 22B is improved, and thereby the negative electrode active material layer 22B is difficult to be peeled off from the negative electrode current collector 22A.

In addition, the negative electrode current collector 22A may have a single layer structure, or a multi-layer structure. In the case of the multi-layer structure, it is preferable that a layer adjacent to the negative electrode active material layer 22B be formed of a metallic material that is alloyed with the negative electrode active material layer 22B, and a layer not adjacent to the negative electrode active material layer 22B be formed of another metallic material.

In addition, it is preferable that a surface of the negative electrode current collector 22A be roughened. This is because that the adhesion property between the negative electrode current collector 22A and the negative electrode active material layer 22B is improved due to so-called anchor effect. In this case, a surface of at least a portion adjacent to the negative electrode active material layer 22B may be roughened. As a roughening method, for example, a method of forming a particulate through an electrolytic treatment, or the like may be exemplified. This electrolytic treatment is a method of providing concave and convex by forming the particulate on a metal surface. When a copper foil is formed by this metal, the copper foil which is subjected to the electrolytic treatment is called an electrolytic copper foil.

The negative electrode active material layer 22B contains one kind or two kinds or more of a negative electrode active material that contributes to an electrode reaction. The kind of this negative electrode active material may be arbitrarily selected depending on the kind of the negative electrode 22 and a use thereof. The third embodiment is appropriately used, particularly, at the time of the negative electrode active material layer 22B in which a pattern is difficult to be formed through a deposition method, a thermal spraying method, or the like. In the deposition method or the thermal spraying method, the negative electrode active material layer 22B, which is applied in a case where for example, a metallic material, an alloy material, or the like is used as the negative electrode material, may be provided on both surfaces or one surface of the negative electrode current collector 22A, as shown in FIG. 9.

The negative electrode active material layer 22B is provided, for example, in such a manner so as to cover the entirety of the both surfaces of the negative electrode current collector 22A, and is formed through a method such as a vapor phase method, a liquid phase method, a thermal spraying method, or two kinds or more thereof, which can perform the formation over the entire surface. However, when the negative electrode lead 26 is provided at the negative electrode active material layer 22B, the negative electrode active material layer 22B may be formed through a method, which can form a pattern, such as a coating method.

The negative electrode lead 26 is formed of the same material as that in the first embodiment.

Figure 10A:
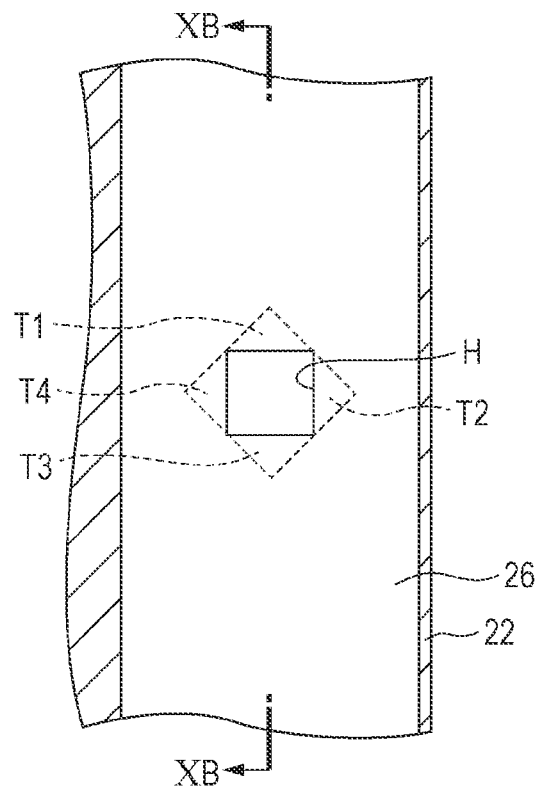
FIGS. 10A and 10B are a top view and a cross sectional view illustrating the negative electrode and the negative electrode lead shown in FIG. 9.
Figure 10B:
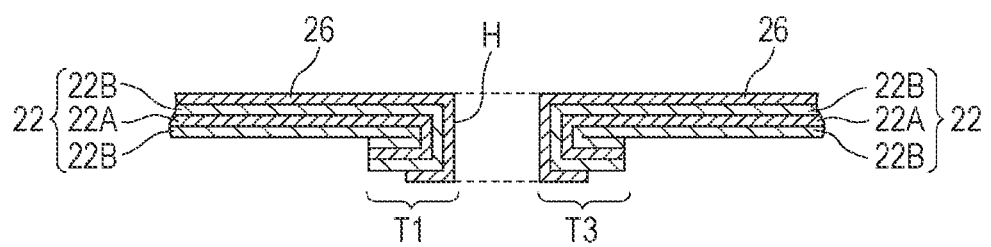

FIG. 10A shows a top view illustrating the main surface of the negative electrode lead 26 at the periphery of the punched hole $H_1$ of the negative electrode 22 of FIG. 9, and FIG. 10B shows a cross-sectional view taken along a line XB-XB in FIG. 10A. In addition, in a case where it is not limited to the punched hole $H_1$ in the following caulking method, this hole is appropriately referred to as a punched hole H.

In the third embodiment, as shown in FIGS. 10A and 10B, the negative electrode 22 and the negative electrode lead 26 are caulked and fixed. Specifically, the punched hole H is provided so as to penetrate through the negative electrode 22 and the negative electrode lead 26. This punched hole H has folded portions T1 to T4 that are folded in a direction away from the punched hole H, for example, with the negative electrode 22 set as an inner side at the periphery of the punched hole H. In addition, the number of the folded portions is not limited to four.

In the negative electrode 22, a thickness of the negative electrode active material layer 22B is uniform at a region where the negative electrode lead 26 is not provided (region where the negative electrode 22 and the negative electrode lead 26 are not caulked). On the contrary, a thickness of the negative electrode active material layer 22B is non-uniform at a region where the negative electrode lead 26 is provided (region where the negative electrode 22 and the negative electrode lead 26 are caulked). When a thickness at the time of forming the negative electrode active material layer 22B on the negative electrode current collector 22A (thickness of the negative electrode active material layer 22B before the negative electrode 22 and the negative electrode lead 26 are caulked) is made as a reference, this term "uniform" means a state where the thickness is substantially maintained in the region. On the contrary, the term "non-uniform" means a state where the thickness of the negative electrode active material layer 22B is not maintained in the region, and this state includes a state where the thickness of the negative electrode active material layer 22B is locally thinned, and a state where the negative electrode active material layer 22B is discontinuous.

In the region where the negative electrode lead 26 is provided, for example, the negative electrode 22 may be folded in many times (for example, double-folding). In this case, a part of the negative electrode active material layer 22B is extended, and thereby the thickness thereof is locally thinned, such that the negative electrode lead 26 becomes close to the negative electrode current collector 22A. In addition, a part of the negative electrode active material layer 22B is detached from the negative electrode current collector 22A, and thereby the negative electrode active material layer 22B is discontinued, such that the negative electrode current collector 22A is partially exposed from the negative electrode active material layer 22B and comes into contact with the negative electrode lead 26. That is, the negative electrode current collector 22A and the negative electrode lead 26 is electrically conducted at a contact point in which the negative electrode active material layer 22B is discontinued.

In addition, the connection of the negative electrode lead 26 through the caulking is realized by a general caulking method.

Effect

According to the third embodiment, the same effect as that of the first embodiment is obtained.

4. Fourth Embodiment

In this fourth embodiment, a nonaqueous electrolyte battery using a laminated body in which a positive electrode and a negative electrode are laminated will be described.

4-1. Configuration of Nonaqueous Electrolyte Battery

Figure 11A:
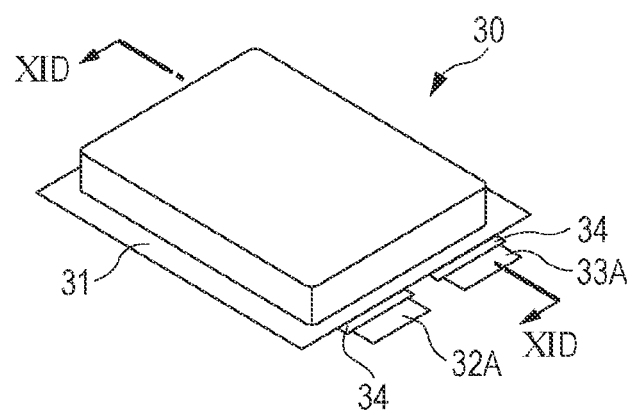
FIGS. 11A to 11D are perspective views and a cross-sectional view illustrating a first configuration example of a nonaqueous electrolyte battery according to a fourth embodiment of the present disclosure.
Figure 11B:
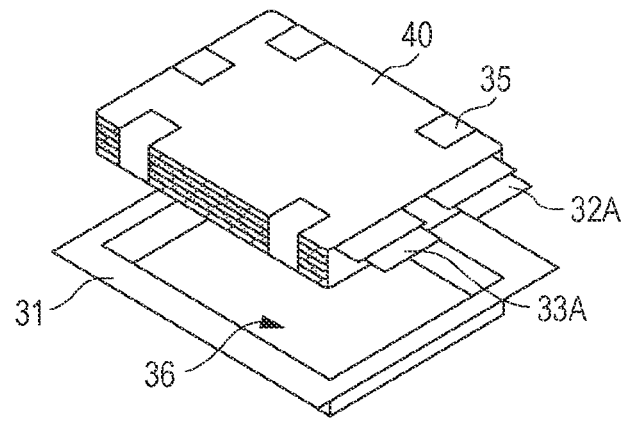
Figure 11C:
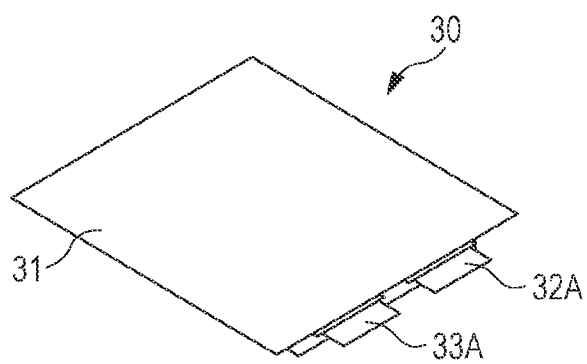
Figure 11D:
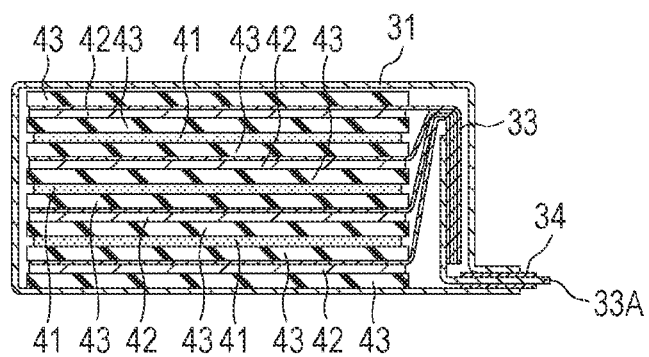

FIG. 11A shows a perspective view illustrating appearance of a nonaqueous electrolyte battery 30 according to the fourth embodiment, and FIG. 11B shows an exploded perspective view illustrating a configuration of the nonaqueous electrolyte battery 30. In addition, FIG. 11C shows a perspective view illustrating a configuration of a lower surface of the nonaqueous electrolyte battery 30, and FIG. 11D shows a cross-sectional view illustrating a cross-section taken along a line XID-XID in FIG. 11A. In addition, in the following description, in the nonaqueous electrolyte battery 30, a portion from which a positive electrode lead 32 and a negative electrode lead 33 protrude is referred to as a top portion, a portion that is opposite to the top portion is referred to as a bottom portion, and both sides interposed between the top portion and the bottom portion are referred to as side portions.

In the nonaqueous electrolyte battery 30 according to this embodiment of the present disclosure, a laminated electrode body 40 is packaged by a laminated film 31, and from a portion at which the laminated film 31 itself is sealed, the positive electrode lead 32 and the negative electrode lead 33 connected to the laminated electrode body 40 are lead-out to the outside of the battery.

In addition, at a part of the positive electrode lead 32 and a part of the negative electrode lead 33, a sealant 34, which is adhesive film for improving the adhesiveness between the laminated film 31 and the positive and negative electrode leads 32 and 33, is provided, respectively. The sealant 34 is formed of a resin material having a high adhesiveness with the metal material, and in a case where the positive electrode lead 32 and the negative electrode lead 33 are formed of the above-described metallic material, it is preferable that the sealant 34 be formed of polyolefin resin such as polyethylene, polypropylene, modified polyethylene, and modified polypropylene.

Figure 12A:
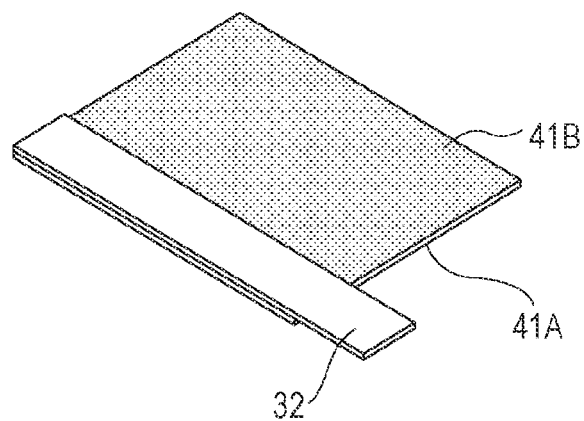
FIGS. 12A and 12B are perspective views illustrating a first configuration example of a positive electrode and a negative electrode that are used in the nonaqueous electrolyte battery according to the fourth embodiment of the present disclosure.
Figure 12B:
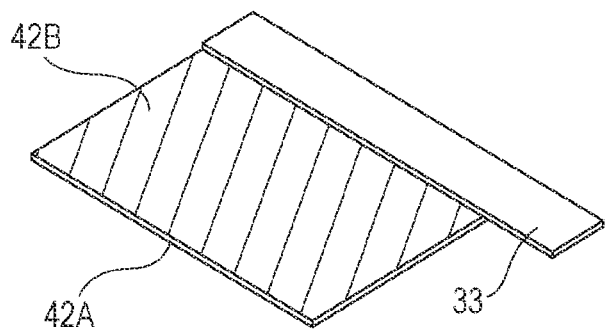
Figure 13A:
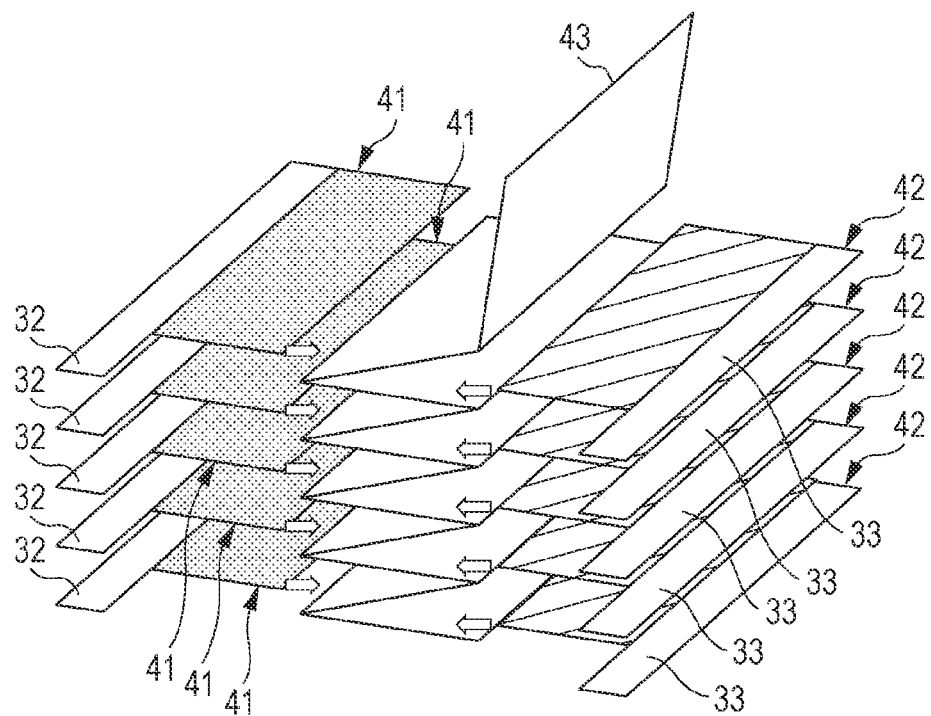
FIGS. 13A and 13B are perspective views illustrating a first configuration example of a laminated electrode body according to the fourth embodiment of the present disclosure.
Figure 13B:
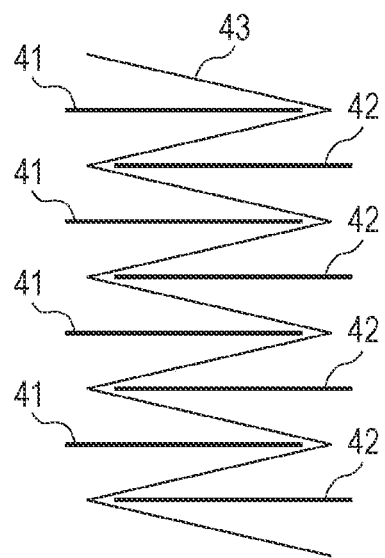

The laminated electrode body 40 accommodated in the nonaqueous electrolyte battery 30 has a configuration in which a positive electrode 41 having a rectangular shape as shown in FIG. 12A, and a negative electrode 42 having a rectangular shape as shown in FIG. 12B are laminated through the separator 43. Specifically, for example, as shown in FIGS. 13A and 13B, the positive electrode 41 and the negative electrode 42 are alternately laminated with the separator 43 folded in a zigzag fashion interposed therebetween. In addition, plural sheets of separators 43 having a rectangular shape may be prepared and the positive electrode 41 and the negative electrode 42 may be alternately laminated.

Laminated Electrode Body

The laminated electrode body 40 has a configuration in which a positive electrode 41 having a rectangular shape and a negative electrode 42 having a rectangular shape are alternately laminated through the separator 43. On a surface of the positive electrode 41 and the negative electrode 42, an electrolyte layer may be provided.

From the laminated electrode body 40, electrode leads 32 connected to plural sheets of positive electrodes 41, respectively, and negative electrode leads 33 connected to plural sheets of negative electrodes 42, respectively, are lead-out. The positive electrode leads 32, which include a plurality of overlapping sheets, are configured to be folded in such a manner that a cross-section has an approximately U-shape with appropriate looseness maintained at a curved portion. A positive electrode tab 32A is connected to a front end of the positive electrode leads 32 including the plurality of overlapping sheets through a method such as an ultrasonic welding and a resistance welding, or the like.

In addition, similarly to the positive electrode leads 32, after a plural sheets are overlapped, the negative electrode leads 33 are configured to be folded in such a manner that a cross-section has an approximately U-shape with appropriate looseness maintained at a curved portion. A negative electrode tab 33A is connected to a front end of the negative electrode leads 33 including the plurality of overlapping sheets through a method such as an ultrasonic welding and a resistance welding, or the like.

Hereinafter, a configuration of the positive electrodes 41 and the negative electrodes 42 will be described.

Positive Electrode

As shown in FIG. 12A, in each of the positive electrodes 41, a positive electrode active material layer 41B containing a positive electrode active material is formed on both surfaces of a positive electrode current collector 41A, respectively. The positive electrode current collector 41A and the positive electrode active material layer 41B may be formed of the same material as that in the first embodiment.

The positive electrode lead 32 is connected to an exposed portion of a positive electrode current collector provided on the positive electrode current collector 41A. The positive electrode lead 32 is connected to the positive electrode current collector 41A through an ultrasonic welding, a resistance welding, or the like, similarly to the first embodiment.

At this time, the positive electrode lead 32 may be connected in such a manner that an electrode connection side one end of the positive electrode lead 32 has the same positional relationship as that of the negative electrode lead described in the first embodiment. In addition, it is preferable that edges of the positive electrode lead 32 be subjected to a chamfering process, similarly to the first embodiment. In addition, a main surface of at least the electrode connection side end portion of the positive electrode lead 32 may have a shape in which corner portions are subjected to the chamfering process.

In addition, in the fourth embodiment, the positive electrode lead 32 is connected to each of the plural sheets of positive electrodes 41 that are laminated. Therefore, each of the positive electrodes 41 receives a large pressure due to electrode expansion regardless of a position such as an inner side of the laminated electrode body 40 and a surface side thereof. Therefore, in the fourth embodiment, it is preferable that the electrode connection side one end of the positive electrode 32 be located at an external side in relation to an end portion of the positive electrode 41, similarly to the negative electrode lead 26 in the first embodiment.

Negative Electrode

As shown in FIG. 12B, in each of the negative electrodes 42, a negative electrode active material layer 42B containing a negative electrode active material is formed on both surfaces of a negative electrode current collector 42A, respectively. It is preferable that the negative electrode 42 be formed to have external dimensions larger than those of the positive electrode 41. The negative electrode current collector 42A and the negative electrode active material layer 42B may be formed of the same material as that in the first embodiment.

The negative electrode lead 33 is connected to an exposed portion of a negative electrode current collector provided on the negative electrode current collector 42A. The negative electrode lead 33 is connected to the negative electrode current collector 42A through an ultrasonic welding, a resistance welding, or the like, similarly to the first embodiment.

In addition, the negative electrode active material layer 42B may be formed of a layer of a metallic material, an alloy material, or the like, and the negative electrode lead 33 may be connected to a surface of the negative electrode active material layer 42B. This negative electrode 42 may be manufactured by the same method as that in the third embodiment.

At this time, the negative electrode lead 33 is connected in such a manner that an electrode connection side one end of the negative electrode lead 33 has the same positional relationship as that of the negative electrode lead described in the first embodiment. In addition, it is preferable that edges of the negative electrode lead 33 be subjected to a chamfering process similarly to the first embodiment. In addition, a main surface of at least the electrode connection side end portion of the negative electrode lead 33 may have a shape in which corner portions are subjected to the chamfering process.

Configuration of Nonaqueous Electrolyte Battery

In the nonaqueous electrolyte battery 30, the above-described laminated electrode body 40 is sealed together with no nonaqueous electrolyte by the laminated film 31. The plural sheets of positive electrode leads 32 that are electrically connected to the laminated electrode body 40 are connected to the positive electrode tab 32A, respectively, and the positive electrode tab 32A is lead-out from the sealing portion of the laminated film 31 to the outside of the battery. In addition, the plural sheets of negative electrode leads 33 that are electrically connected to the laminated electrode body 40 are connected to the negative electrode tab 33A, respectively, and the negative electrode tab 33A is lead-out from the sealing portion of the laminated film 31 to the outside of the battery. In addition, as a material of the separator 43, the same material as that in first embodiment may be used.

Nonaqueous Electrolyte

The nonaqueous electrolyte that is obtained by dissolving an electrolyte salt in a nonaqueous solvent and is sealed in the laminated film 31 together with the laminated electrode body 40. As the nonaqueous electrolyte, an electrolytic solution obtained by dissolving an electrolyte salt in a nonaqueous solvent similarly to the first embodiment may be used. In addition, a polymer electrolyte obtained by taking an electrolytic solution into a matrix polymer may be used.

In the case of using the polymer electrolyte, as the matrix polymer, a polymer material compatible with a nonaqueous solvent is used. As such a matrix polymer, a silicone gel, an acryl gel, an acrylonittrile gel, a polyorganophosphazene-modified polymer, polyethylene oxide, a polypropylene oxide, and a complex polymer, a cross-linked polymer, and a modified polymer thereof, or the like may be used. In addition, as a fluorine-based polymer, a polymer such as a polyvinylidene fluoride (PVdF), a copolymer including vinylidene fluoride (VdF) and hexafluoropropylene (HFP) in a repeating unit, a polymer including vinylidene fluoride (VdF) and trifluoroethylene (TFE) in a repeating unit may be exemplified. These polymers may be used alone, or may be used in a state where two kinds or more are mixed.

Laminated Film

Figure 14:
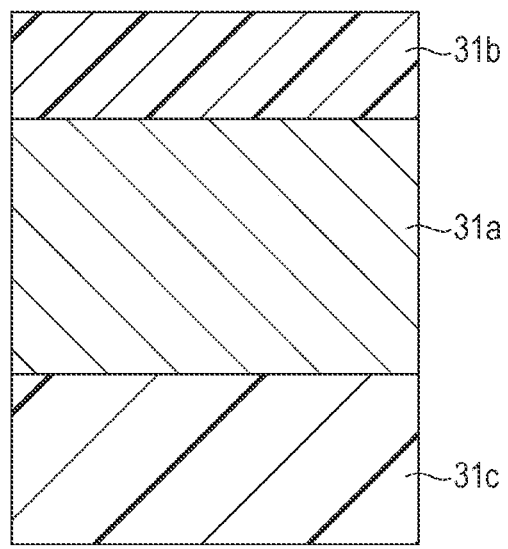
FIG. 14 is a cross-sectional view illustrating a configuration of an exterior material that is used in the nonaqueous electrolyte battery according to the fourth embodiment of the present disclosure.

The laminated film 31, which is an exterior material for packaging the laminated electrode body 40, has a configuration in which a resin layer is provided on both surfaces of a metallic layer 31a formed of metallic foil, as shown in FIG. 14. The laminated film is generally configured to have a laminated structure of an outer side resin layer 31b/a metallic layer 31a/an inner side resin layer 31c, and the inner side resin layer 31c is formed to be opposite to the laminated electrode body 40. An adhesive layer having a thickness of approximately 2 to 7 μm may be provided between the outer side and inner side resin layers 31b and 31c, and the metallic layer 31a. The outer side resin layer 31b and the inner side resin layer 31c may be configured with a plurality of layers, respectively.

A metallic material making up the metallic layer 31a may have a function as a barrier film with a moisture permeability resistance, and aluminum (Al) foil, stainless steel (SUS) foil, nickel (Ni) foil, plated iron (Fe), or the like may be used. Among these, it is preferable to appropriately use the aluminum foil that is light and thin, and is excellent in workability. Particularly, from a viewpoint of the workability, annealed aluminum (JIS A8021P-O), (JIS A8079P-O), (JIS AlN30-O), or the like may be preferably used.

The thickness of the metallic layer 31a may be arbitrarily selected as long as strength necessary for the exterior material can be obtained, but it is preferable that the thickness be set to 30 to 100 μm. When the thickness is set within this range, it is possible to have sufficient material strength and a high workability. In addition, it is possible to suppress a decrease in a volume efficiency of the nonaqueous electrolyte battery 30 due to an increase in the thickness of the laminated film 31.

The inner side resin layer 31c is a portion that is melted through heating and fuses with the other inner side resin layer 31c. As a material of the inner side resin layer 31c, polyethylene (PE), casted polypropylene (CPP), polyethylene terephthalate (PET), low density polyethylene (LDPE), high density polyethylene (HDPE), linear low density polyethylene (LLDPE), or the like may be exemplified, and plural kinds thereof may be selected and used.

It is preferable that the thickness of the inner side resin layer 31c be 20 to 90 μm. When the thickness is set within this range, a sealing property of the laminated film 31 is increased, and a pressure-damping operation is sufficiently obtained, such that it is possible to suppress the generation of short circuit. In addition, when the thickness of the inner side resin layer 31c, which becomes a path through which moisture penetrates, is not made to be larger than necessary, it is possible to prevent the generation of gas inside the battery, a battery expansion accompanied with this gas generation, and a decrease in a battery characteristic. In addition, the thickness of the inner side resin layer 31c is a thickness in a state before the laminated electrode body 40 is packaged. After the laminated electrode body 40 is packaged by the laminated film 31 and is sealed, two layers of the inner side resin layer 31c fuse with each other, such that the thickness of the inner side resin layer 31c may be away from the range.

As a material of the outer side resin layer 31b, a polyolefin-based resin, a polyamide-based resin, a polyimide-based resin, polyester, or the like may be used taking into consideration aesthetics, tenacity, or softness. Specifically, nylon (Ny), polyethylene terephthalate (PET), polyethylene naphthalate (PEN), polybuthylene terephthalate (PBT), or polybuthylene naphthalate (PBN) may be used, and plural kinds thereof may be selected and used.

In addition, the adhesion of the laminated film 31 is performed in such a manner that the two layers of the inner side resin layer 31c are melted by heating and fuse with each other, such that it is preferable that the outer side resin layer 31b have a melting point higher than that of the inner side resin layer 31c. This is because that only the inner side resin layer 31c is melted at the time of the thermal fusion. Therefore, as a material of the outer side resin layer 31b, a material, which can be used depending on the resin material of the inner side resin layer 31c, may be selected.

It is preferable that the thickness of the outer side resin layer 31b be 25 to 50 μm. When the thickness is set within this range, it is possible to sufficiently obtain a function as a protective layer, and the thickness is not unnecessarily increased, such that it is possible to suppress a decrease in a volume efficiency of the nonaqueous electrolyte battery 30.

The laminated electrode body 40 is packaged by the laminated film 31. At this time, the positive electrode tab 32A connected to the positive electrode lead 32 and the negative electrode tab 33A connected to the negative electrode lead 33 are lead-out from the sealing portion of the laminated film 31 to the outside. As shown in FIG. 11B, the laminated film 31 has an electrode body accommodating portion 36 formed in advance by a deep drawing. The laminated electrode body 40 is accommodated in the electrode body accommodating portion 36.

In this embodiment, the periphery of the laminated electrode body 40 is heated by a heater head, such that the plural sheets of laminated films 31 covering the laminated electrode body 40 from both sides thereof are thermally fused and sealed. Particularly, in regard to a side of the laminated film 31 from which the leads are lead-out, it is preferable that the laminated film 31 is thermally fused by using a heater head that is cut-out with a shape so as not to come into contact with the positive electrode lead 32 and the negative electrode lead 33. This is because that it is possible to manufacture a battery with load applied to the positive electrode lead 32 and the negative electrode made to be small. Through this method, it is possible to prevent short circuit during the battery is manufactured.

In regard to the nonaqueous electrolyte battery 30 according to this embodiment of the present disclosure, the thickness of a lead lead-out portion after the sealing of the laminated film 31 through a thermal fusion is controlled, such that this battery 30 has high safety and battery characteristics.

4-2. Method of Nonaqueous Electrolyte Battery

The above-described nonaqueous electrolyte battery may be manufactured processes described below.

The laminated electrode body 40 is formed by laminating the positive electrode 41 and the negative electrode 42 obtained by shaping the positive electrode 21 and the negative electrode 22 in the first embodiment to have a rectangular shape, and may be manufactured by the same method as that for manufacturing a laminated electrode body of the related art. In addition, in the fourth embodiment, the positive electrode 41 and the negative electrode 42 are alternately laminated with the separator folded in a zigzag fashion interposed therebetween. After the positive electrode 41 and the negative electrode 42 are laminated, these electrodes 41 and 42 are fixed in a pressed state to be brought into closely contact with each other, and thereby the laminated electrode body 40 is manufactured. A fixing member 35 such as an adhesive tape may be used to strengthen the fixing. As shown in FIG. 11B, the fixing member 35 is provided, for example, at both side portions and the bottom portion of the laminated electrode body 40.

In addition, in the case of using a gel electrolyte, after a gel electrolyte layer is formed at both surfaces of each of the positive electrode 41 and the negative electrode 42, these electrodes 41 and 42 are laminated with the separator 43 interposed therebetween.

In addition, as a method of forming another gel electrolyte, a method where a matrix polymer is attached in advance to both surfaces of the separator 43 may be exemplified. In this case, after the packaging using the laminated film 31, the nonaqueous electrolytic solution is injected and the sealing is performed. In addition, the battery is pressed and heated from the outside, and thereby the nonaqueous electrolytic solution is retained in the matrix polymer. In this way, it is possible to form the gel electrolyte.

Next, the plural sheets of positive electrode leads 32 and the plural sheets of negative electrode leads 33 are folded back to have an approximately U-shaped cross-section, and the positive electrode tab 32A and the negative electrode tab 33A are connected to each of the positive electrode leads 32 and the negative electrode leads 33, respectively.

Packaging Process

The manufactured laminated electrode body 40 is packaged by the laminated film 31, and one of the side portions and the bottom portion are heated using a heater head and are thermally fused. In addition, the top portion from which the positive electrode lead 32 and the negative electrode 33 are lead-out is also heated using a heater head having the cut-out portion and is thermally fused. Subsequently, the nonaqueous electrolytic solution is injected from an opening of the other side portion that is not thermally fused. Finally, the laminated film 31 located at the side portion in which the injection was performed is thermally fused, and thereby the laminated electrode body 40 is sealed inside the laminated film 31. In the case of using the separator 43 to which the matrix polymer is attached, the laminated electrode body 40 is pressed and heated from the outside of the laminated film 31, and thereby the nonaqueous electrolytic solution is retained in the matrix polymer. In this way, the gel electrolyte is formed.

5. Fifth Embodiment

In this fifth embodiment, a square type battery to which the negative electrode in the first embodiment is applied will be described.

Figure 15:
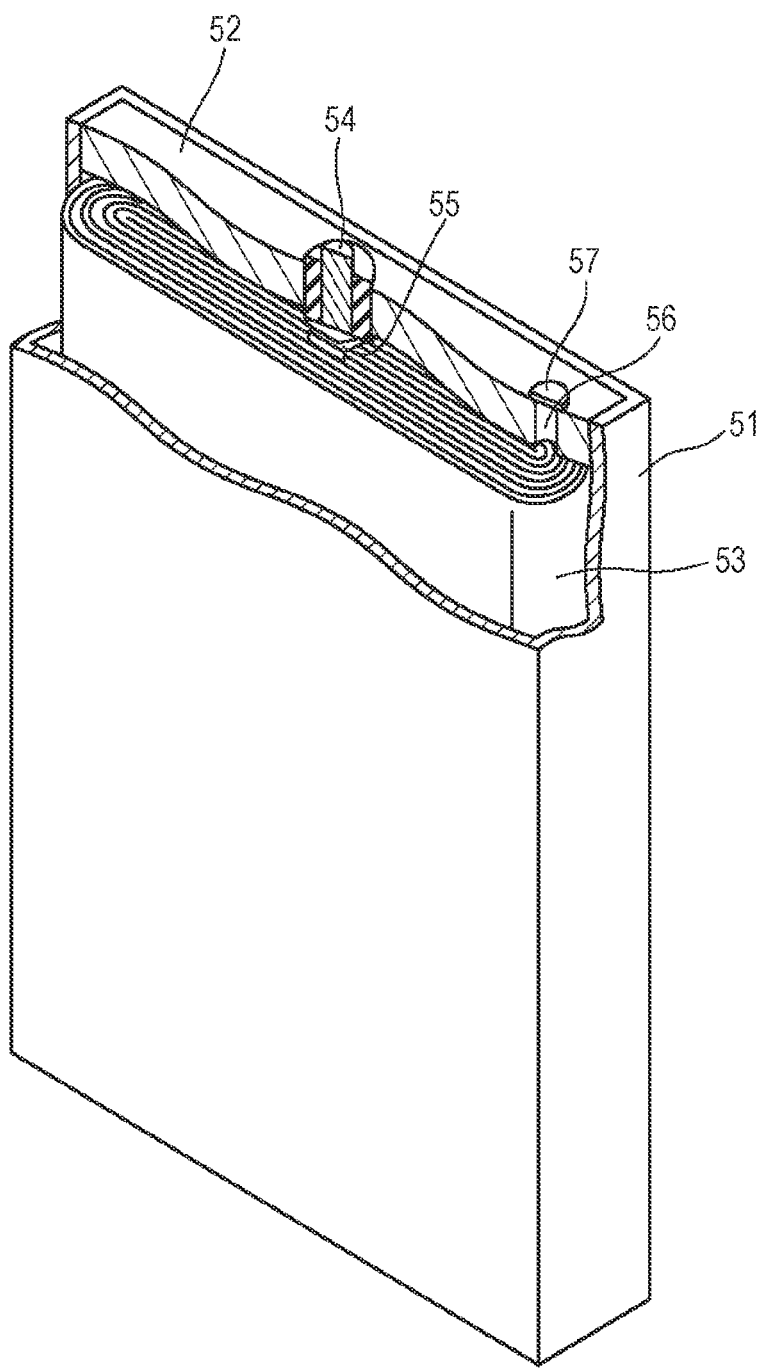
FIG. 15 is a perspective view illustrating a first configuration example of a square type nonaqueous electrolyte battery according to a fifth embodiment of the present disclosure.

FIG. 15 illustrates a square type battery 50 according to the fifth embodiment. A wound electrode body 53 in which a position of a negative electrode lead is adjusted similarly to the first embodiment is accommodated in the square type battery 50. Each configuration described in the first and second embodiments such as an edge chamfering process and an insulation process may be applied to the negative electrode lead used in the square type battery 50. The wound electrode body 53 may be manufactured by the same method as that for manufacturing the wound electrode body 20 in the first embodiment except that the electrode body 53 is wound in flat shape.

The square type battery 50 is manufactured as described below. First, the wound electrode body 53 is accommodated in an exterior casing 51 that is a square type casing formed of metal such as aluminum (Al) and iron (Fe).

In addition, after an electrode pin 54 provided in a battery cover 52 and an electrode terminal 55 that is lead-out from the wound electrode body 53 are connected, the battery 50 is sealed by a battery lid 52. Then, a nonelectrolytic solution is injected from a nonelectrolytic solution injecting port 56, and this port 56 is sealed by a sealing member 57. In this manner, it is possible to obtain the square type battery 50 according to the fifth embodiment.

Effect

According to the fifth embodiment, it is possible to obtain the same effect as that of the first embodiment.

In the above-described first to fifth embodiments, the description was made with respect to a case where the size of the negative electrode is larger than that of the positive electrode, but an embodiment of the present disclosure is not limited thereto. It is preferable that in a battery system in which the size of the negative electrode is larger than that of the positive electrode, the position of the negative electrode lead described in respective embodiments be adjusted as a position of the positive electrode lead. Even when the size of the negative electrode is larger than that of the positive electrode, in a case where in the wound electrode body, the electrode lead is located at a winding outer circumference side, it is preferable to adjust the position of the positive electrode lead because stress is easily focused on an edge portion of the positive electrode lead.

EXAMPLES

Hereinafter, the present disclosure will be described with reference to examples. In addition, FIGS. 16A to 16D represent a position of a negative electrode lead of a negative electrode used in an example.

Figure 16A:
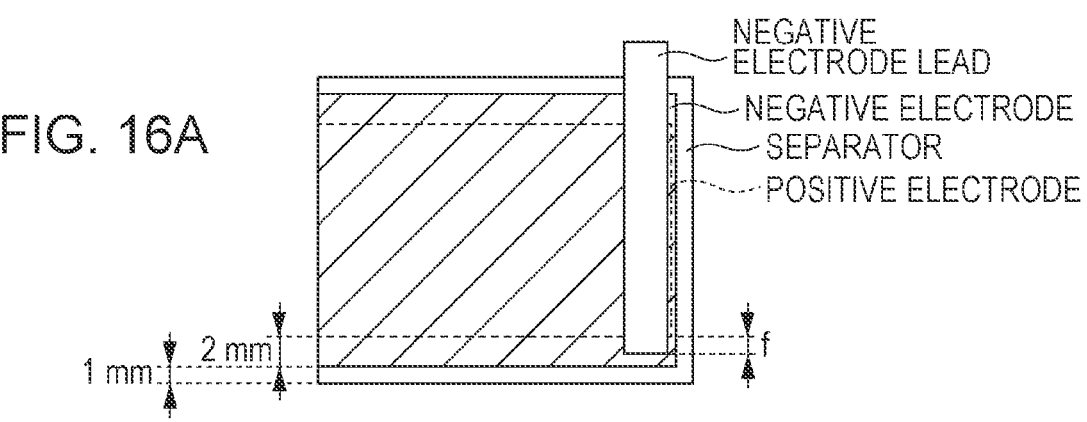
FIGS. 16A to 16D are top views illustrating an example of the present disclosure.
Figure 16B:
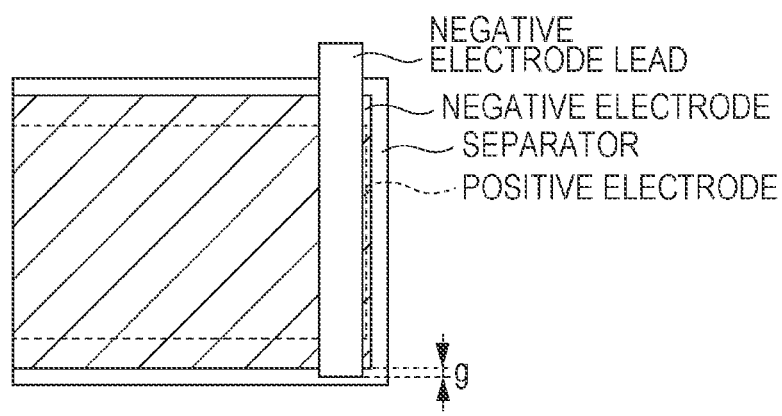
Figure 16C:
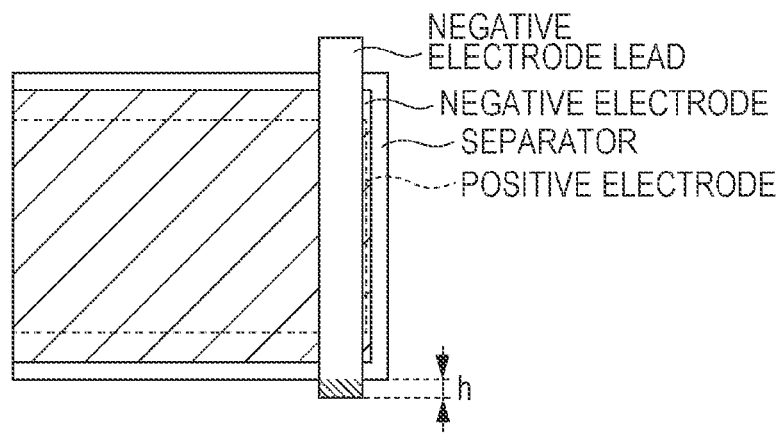
Figure 16D:
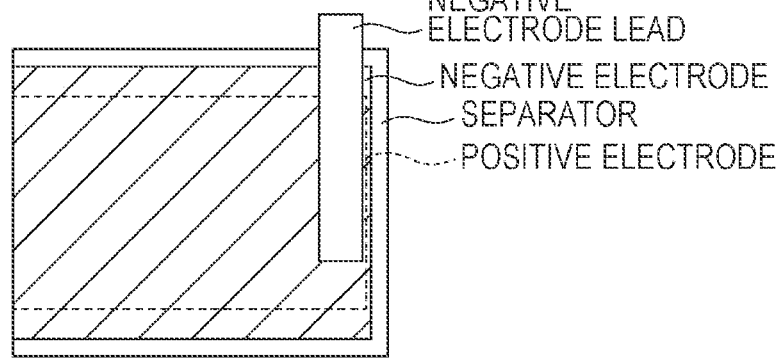

FIG. 16A illustrates a state where an electrode connection side one end of the negative electrode lead is located between a positive electrode end portion and a negative electrode end portion, and a protruded length of a region where the negative electrode lead protrudes from the positive electrode end portion toward the outside is designated by "f". FIG. 16B illustrates a state where the electrode connection side one end of the negative electrode lead is located between the negative electrode end portion and a separator end portion, and a protruded length of a region where the negative electrode lead protrudes from the negative electrode end portion toward the outside is designated by "g". FIG. 16C illustrates a state where the electrode connection side one end of the negative electrode lead is located at the outside of the separator end portion, and a protruded length of a region where the negative electrode lead protrudes from the separator end portion to the outside is designated by "h". FIG. 16D illustrates a state where the negative electrode lead is located above the positive electrode. In addition, in regard to each of the protruded lengths f, g, and h, a direction toward the outside of the electrode body is set to a positive direction.

Example 1

In an example 1, safety was confirmed by using a square type battery and a cylinder type battery in which a connection position of the negative electrode lead was adjusted.

Example 1-1

Manufacturing of Negative Electrode

A negative electrode current collector that is formed of electrolytic copper foil and has a thickness of 24 μm and ten-point mean roughness Rz of 3.0 μm was prepared. Subsequently, a negative electrode active material layer was formed on one surface of the negative electrode current collector through an electron beam deposition method using a deflection type electron beam deposition source while introducing oxygen gas and water vapor as necessary into a chamber. Specifically, as a negative electrode active material, a plurality of negative electrode active material particles having a multi-layer structure were formed by depositing silicon (Si) over 1400 times. A thickness (total film thickness) of the negative electrode active material particles was set to 8.4 μm. In addition, the negative electrode active material layer where the silicon (Si) was deposited was also formed on the other surface of the negative electrode current collector.

Subsequently, a negative electrode lead that is formed of nickel (Ni) and that has a width of 5 mm and a thickness of 100 μm was connected, through a caulking method, to the negative electrode in which the negative electrode active material layer was formed on the entire surface of the negative electrode current collector. At this time, a negative electrode connection side end portion of the negative electrode lead was adjusted to be located between the positive electrode end portion and the negative electrode end portion as shown in FIG. 16A, in regard to a laminated electrode body in which the positive electrode and the negative electrode are laminated later.

In addition, the ten-point mean roughness Rz of the negative electrode body was measured by a stylus-type film thickness meter (trade name: Dektak3ST, manufactured by ULVAC, Inc.).

Manufacturing of Positive Electrode 96 mass % of cobalt acid lithium (LiCoO$_2$), which is a positive electrode active material and has a particle size of 5 μm, 1 mass % of carbon black that is a conducting agent, and 3 mass % of polyvinylidene fluoride that is a bonding agent were mixed, and this mixture was dissolved in N-methyl-2-pyrrolidone (NMP) that is a dispersion medium and thereby a positive electrode mixture slurry was prepared. Then, the positive electrode mixture slurry was uniformly applied on both surfaces of the positive electrode collector that is formed of aluminum (Al) and has a thickness of 15 μm, was dried, and was compression-molded using a roll pressing machine and thereby the positive electrode active material layer was formed.

In addition, at the time of forming the positive electrode active material layer, the positive electrode mixture slurry was applied on the positive electrode current collector that is continuous in a strip shape as shown in FIG. 2A, in such a manner that one side of the positive electrode current collector in a lateral direction was exposed. Subsequently, a positive electrode lead that is formed of aluminum (Al) and has a width of 3 mm and a thickness of 100 μm was connected to an exposed portion of the positive electrode current collector through welding.

Adjustment of Nonaqueous Electrolytic Solution

A mixed solvent obtained by mixing 30 mass % of ethylene carbonate (EC) 60 mass % of diethyl carbonate (DEC), and 10 mass % of vinylene carbonate (VC) was used as a nonaqueous solvent. Adjustment of the nonaqueous solvent was performed by adding 1.0 mol/L of lithium hexafluorophosphate (LiPF$_6$) as an electrolyte salt to the mixed solvent.

Assembly of Nonaqueous Electrolyte Battery

The positive electrode and the negative electrode manufactured as described were laminated with a separator interposed therebetween as shown in FIG. 3. As the separator, a separator, which has a thickness of 23 μm and has a structure in which a core material film containing porous polyethylene as a main component is interposed between films containing porous polypropylene, was used. Next, the laminated electrode was wound with a positive electrode lead connection side one end of the laminated electrode body set as a winding initial end portion and thereby a flat type wound electrode body was manufactured. Finally, this electrode body was inserted in a square type battery exterior casing as shown in FIG. 15 and thereby a test battery formed of a square type battery was obtained.

Example 1-2

A test battery was manufactured similarly to the example 1-1, except that a cylinder type battery was formed by winding the wound electrode body into a cylinder type and inserting it in a cylinder type exterior casing as shown in FIG. 1. In addition, the cylinder type battery of example 1-2 was manufactured as described below.

The laminated electrode body was wound into the cylinder type and the wound electrode body was manufactured, and the negative electrode lead lead-out from the wound electrode body was connected to the bottom of the cylinder type battery casing shown in FIG. 1. Then, the wound electrode body interposed between insulating plates was inserted in the battery casing, and the nonaqueous electrolytic solution was injected. Next, the positive electrode lead lead-out from the wound electrode body was connected to a safety valve electrically connected to a battery lid, and the battery lid was caulked to the battery casing with an insulating sealing gasket interposed therebetween and thereby a test battery was manufactured.

Comparative Example 1-1

A test battery was manufactured similarly to the example 1-1, except that at the time of connecting the negative electrode lead, a negative electrode connection side end portion of the negative electrode lead was adjusted to be located over the positive electrode in the laminated electrode in which the positive electrode and the negative electrode were laminated, as shown in FIG. 16D.

Comparative Example 1-2

A test battery was manufactured similarly to the example 1-1, except that at the time of connecting the negative electrode lead, a negative electrode connection side end portion of the negative electrode lead was adjusted to be located over the positive electrode in the laminated electrode in which the positive electrode and the negative electrode were laminated, as shown in FIG. 16D and a cylinder type battery was manufactured by using this negative electrode.

Evaluation of Battery: Short Circuit Test

Ten batteries were prepared for each examples and comparative example, respectively, and it was confirmed whether or not short occurs at the time of an initial charge and discharge of the test battery. The number of shorts was confirmed by measuring resistance between the positive electrode lead and the negative electrode lead. Immediately after being manufactured, the battery has a sufficient large DC resistance, but it is shorted, the resistance value becomes small in the order of mΩ.

In addition, the test battery of each example and comparative example was subjected to a constant current charge with 1C of constant current until a battery voltage reached 4.2V, and was subjected to a constant voltage charge with 4.2V of constant voltage until a total charge time of 2.5 hours. Next, the test battery was subjected to a constant current discharge with 1C of constant current until a battery voltage reached 3.0 V.

Results of the above-described evaluation were shown in Table 1.

As can be seen from Table 1, in each example in which the negative electrode connection side end portion of the negative electrode lead was adjusted to be located between the positive electrode end portion and the negative electrode end portion of the negative electrode lead, a short circuit did not occur regardless of the battery shape. On the contrary, in each comparative example in which the negative electrode connection side end portion of the negative electrode lead was adjusted to be located over the positive electrode, all test batteries were short circuited regardless of the battery shape.

Example 2

In example 2, safety was confirmed by using square type and cylinder type batteries in which a connection position of the negative electrode lead was adjusted.

Example 2-1

A test battery was manufactured similarly to the example 1-1, except that the negative electrode active material layer was formed by the application of silicon (Si) as a negative electrode active material, and the negative electrode lead was connected to an exposed portion of the negative electrode current collector formed on a surface of the negative electrode through a welding method.

In addition, the negative electrode active material layer was formed as described below. First, a polyamic acid solution in which N-methyl-2-pyrrolidone (NMP) that is a precursor of the negative electrode binding agent and N,N-dimethylacetamide are used as a solvent was prepared. Subsequently, a silicon (Si) powder as a negative electrode active material and the polyamic acid solution were mixed in a dried mass ratio of 80:20, and this mixture was dispersed in N-methyl-2-pyrrolidone (NMP) and thereby negative electrode mixture slurry was prepared. Subsequently, the negative electrode mixture slurry was uniformly pattern-applied, by a coating device, onto both surfaces of the negative electrode current collector that is formed of electrolytic coffer foil and has a thickness of 15 μm and 10-points mean roughness Rz of 1.1 μm and was dried. Then, a surface of the negative electrode was compression-molded by a roll compressing machine, and a heat treatment was performed in a vacuum atmosphere of 400° C. for one hour. In this manner, a negative electrode active material layer of 40 μm per one surface was formed, in which polyimide (PI) as a negative electrode binding agent was generated and a part of the polyimide was present in a carbonized state.

TABLE 1

| | Battery type | Negative electrode active material | Method of forming negative electrode | Connection method of negative electrode | Position of negative electrode lead | | The number of short circuits |
|---|---|---|---|---|---|---|---|
| | | | | | Position of electrode connection side end portion | Figure | |
| Example 1-1 | Square type | Si | Deposition | Caulking method | Between positive electrode end portion and negative electrode end portion | FIG. 16A | 0/10 |
| Example 1-2 | Cylinder type | Si | Deposition | Caulking method | Between positive electrode end portion and negative electrode end portion | FIG. 16A | 0/10 |
| Comparative Example 1-1 | Square type | Si | Deposition | Caulking method | Over positive electrode | FIG. 16D | 10/10 |
| Comparative Example 1-2 | Cylinder type | Si | Deposition | Caulking method | Over positive electrode | FIG. 16D | 10/10 |

In addition, the 10-points mean roughness Rz of the negative electrode body was measured by a stylus-type film thickness meter (trade name: Dektak3ST, manufactured by ULVAC, Inc.).

Example 2-2

A test battery was manufactured by the same method as that in the example 2-1, except that a cylinder type battery was formed by winding the wound electrode body into a cylinder type and inserting it in a cylinder type exterior casing as shown in FIG. 1.

Example 2-3

As raw materials, a cobalt (Co) powder, a tin (Sn) powder, a carbon (C) powder, and phosphorus (P) powder were prepared. The cobalt powder and the tin powder were alloyed and a cobalt tin alloy powder was prepared. Then, the carbon powder and the phosphorus powder were added to the alloy powder and thereby an active material mixture was prepared. In raw material ratios (raw material ratio: mass %), a raw material ratio of phosphorus was fixed to 1.5 mass %, and a ratio of cobalt was fixed to 37 mass %. The raw materials were mixed in such a manner that a raw material ratio of carbon was 20 mass %, that is, a raw material ratio of phosphorus:cobalt:tin:carbon was 1.5:37:41.5:20. This mixture was subjected to a dry mixing process using a ball mill in an argon (Ar) atmosphere for 20 hours, and thereby a negative electrode active material was synthesized.

Consequently, 70 mass % of the negative electrode active material powder prepared as described above, 20 mass % of graphite that is another negative electrode active material and also serves as a conducting agent, 1 mass % of acetylene black that is a conducting agent, and 4 mass % of polyvinylidene fluoride that is a bonding agent were mixed, and this mixture was dispersed in N-methyl-2-pyrrolidone (NMP) and the resultant dispersant was used negative electrode mixture slurry. A test battery was manufactured similarly to the example 2-2 except for this.

Comparative Example 2-1

A test battery was manufactured similarly to the example 2-1, except that at the time of connecting the negative electrode lead, a negative electrode connection side end portion of the negative electrode lead was adjusted to be located over the positive electrode in the laminated electrode in which the positive electrode and the negative electrode were laminated, as shown in FIG. 16D.

Comparative Example 2-2

A test battery was manufactured similarly to the example 2-2, except that at the time of connecting the negative electrode lead, a negative electrode connection side end portion of the negative electrode lead was adjusted to be located over the positive electrode in the laminated electrode in which the positive electrode and the negative electrode were laminated, as shown in FIG. 16D.

Comparative Example 2-3

A test battery was manufactured similarly to the example 2-3, except that at the time of connecting the negative electrode lead, a negative electrode connection side end portion of the negative electrode lead was adjusted to be located over the positive electrode in the laminated electrode in which the positive electrode and the negative electrode were laminated, as shown in FIG. 16D.

Evaluation of Battery: Short Circuit Test

Ten batteries were prepared for each example and comparative example, respectively, and it was confirmed whether or not a short occurs at the time of an initial charge and discharge of the test battery by the same method as that of example 1.

Results of the above-described evaluation were shown in Table 2.

TABLE 2

| | Battery type | Negative electrode active material | Method of forming negative electrode | Connection method of negative electrode | Position of negative electrode lead | | The number of short circuits |
|---|---|---|---|---|---|---|---|
| | | | | | Position of electrode connection side end portion | Figure | |
| Example 2-1 | Square type | Si | Application | Welding method | Between positive electrode end portion and negative electrode end portion | FIG. 16A | 0/10 |
| Example 2-2 | Cylinder type | Si | Application | Welding method | Between positive electrode end portion and negative electrode end portion | FIG. 16A | 0/10 |
| Example 2-3 | Cylinder type | SnCoC + Gr | Application | Welding method | Between positive electrode end portion and negative electrode end portion | FIG. 16A | 0/10 |
| Comparative Example 2-1 | Square type | Si | Application | Welding method | Over positive electrode | FIG. 16D | 8/10 |
| Comparative Example 2-2 | Cylinder type | Si | Application | Welding method | Over positive electrode | FIG. 16D | 8/10 |
| Comparative Example 2-3 | Cylinder type | SnCoC + Gr | Application | Welding method | Over positive electrode | FIG. 16D | 8/10 |

As can be seen from Table 2, in each example in which the negative electrode connection side end portion of the negative electrode lead was adjusted to be located between the positive electrode end portion and the negative electrode end portion, a short circuit did not occur regardless of the battery shape even when the negative electrode was formed by the application and the connection of the negative electrode lead was performed through welding. On the contrary, in the comparative example in which the negative electrode connection side end portion of the negative electrode lead was adjusted to be located over the positive electrode, many test batteries were short circuited regardless of the battery shape. In addition, it can be seen that when the connection of the negative electrode lead was performed through welding, the effect of suppressing a short circuit was slightly high from comparing the comparative example 1-1 and comparative example 1-2, and comparative example 2-1 to comparative example 2-3.

In addition, as can be seen from the example 2-3 and the comparative example 2-3, even when an alloy-based negative electrode was used, it was confirmed that an effect of suppressing a short circuit was present.

Example 3

In this example 3, it was confirmed that safety was improved by processing a negative electrode lead end portion using a cylinder type battery in which a connection position of the negative electrode lead was adjusted. In addition, in this example 3, as shown in FIG. 16A, a clearance between the positive electrode end portion and the negative electrode end portion was set to 2 mm, and a clearance between the negative electrode end portion and the separator end portion was set to 1 mm.

In addition, protrusion lengths "f", "g", and "h" that are indicated by each example and comparative example are portions shown in FIGS. 16A to 16C. In addition, in the protrusion lengths "f", "g", and "h", a direction from an electrode center to the outside was set as a positive direction. Therefore, in a case where the protruded length "f" is negative, this indicates that the negative electrode connection side one end of the negative electrode lead is located at an electrode internal side direction in relation to the positive electrode end portion, that is, the negative electrode connection side one end of the negative electrode lead is located over the positive electrode.

Example 3-1

A cylinder type test battery was manufactured similarly to the example 1-2, except that the processing with respect to the shape of the end portion of the negative electrode lead was not performed, and the position of the negative electrode lead was adjusted in such a manner that the protruded length "f" of the negative electrode connection side one end of the negative electrode lead from the positive electrode end portion was 1 mm. That is, the negative electrode active material layer was formed through deposition, and the connection of the negative electrode lead was performed through a caulking method.

Example 3-2

A cylinder type test battery was manufactured similarly to the example 3-1, except that the position of the negative electrode lead was adjusted in such a manner that the protruded length "f" of the negative electrode connection side one end of the negative electrode lead from the positive electrode end portion was 2 mm, that is, the negative electrode connection side one end of the negative electrode lead was located at the same position as that of the negative electrode end portion.

Example 3-3

A cylinder type test battery was manufactured similarly to the example 3-1, except that the position of the negative electrode lead was adjusted in such a manner that the protruded length "f" of the negative electrode connection side one end of the negative electrode lead from the positive electrode end portion was 0 mm, that is, the negative electrode connection side one end of the negative electrode lead was located at the same position as that of the positive electrode end portion.

Example 3-4

A cylinder type test battery was manufactured similarly to the example 3-1, except that a shape of a main surface portion of the negative electrode connection side one end of the negative electrode lead was made to have an R-shape as shown in FIG. 7A.

Example 3-5

The shape of a main surface portion of the negative electrode connection side one end of the negative electrode lead was made to have an R-shape as shown in FIG. 7A. In addition, the position of the negative electrode lead was adjusted in such a manner that the protruded length "f" of the negative electrode connection side one end of the negative electrode lead from the positive electrode end portion was 0 mm, that is, the negative electrode connection side one end of the negative electrode lead was located at the same position as that of the positive electrode end portion. A cylinder type test battery was manufactured similarly to the example 3-1 except for this.

Example 3-6

The shape of a main surface portion of the negative electrode connection side one end of the negative electrode lead was made to have an R-shape as shown in FIG. 7A. In addition, the position of the negative electrode lead was adjusted in such a manner that the protruded length "f" of the negative electrode connection side one end of the negative electrode lead from the positive electrode end portion was 3 mm, and the protruded length "g" from the negative electrode end portion was 1 mm, that is, the negative electrode connection side one end of the negative electrode lead was located at the same position as that of the separator end portion. A cylinder type test battery was manufactured similarly to the example 3-1 except for this.

Example 3-7

The shape of a main surface portion of the negative electrode connection side one end of the negative electrode lead was made to have an R-shape as shown in FIG. 7A. In addition, the negative electrode connection side one end of the negative electrode lead was coated with a polyethylene (PE) resin. In addition, the position of the negative electrode lead was adjusted in such a manner that the protruded length "f" of the negative electrode connection side one end of the negative electrode lead from the positive electrode end portion was 4 mm, the protruded length "g" from the negative electrode end portion was 2 mm, and the protruded length "h" from the separator end portion was 1 mm, that is, the negative electrode connection side one end of the negative electrode lead protruded from the separator end portion. A cylinder type test battery was manufactured similarly to the example 3-1 except for this.

Comparative Example 1-1

A cylinder type test battery was manufactured similarly to the example 3-1 except that the position of the negative electrode lead was adjusted in such a manner that the protruded length "f" of the negative electrode connection side one end of the negative electrode lead from the positive electrode end portion was −1 mm, that is, the negative electrode connection side one end was located at a position of 1 mm from the positive electrode end portion toward an electrode center side (the negative electrode connection side one end of the negative electrode lead was located over the positive electrode).

Comparative Example 1-2

The shape of a main surface portion of the negative electrode connection side one end of the negative electrode lead was made to have an R-shape as shown in FIG. 7A. In addition, the position of the negative electrode lead was adjusted in such a manner that the protruded length "f" of the negative electrode connection side one end of the negative electrode lead from the positive electrode end portion was −1 mm, that is, the negative electrode connection side one end was located at a position of 1 mm from the positive electrode end portion toward the electrode center side (the negative electrode connection side one end of the negative electrode lead was located over the positive electrode). A cylinder type test battery was manufactured similarly to the example 3-1 except for this.

Comparative Example 1-3

The shape of a main surface portion of the negative electrode connection side one end of the negative electrode lead was made to have an R-shape as shown in FIG. 7A. In addition, the position of the negative electrode lead was adjusted in such a manner that the protruded length "f" of the negative electrode connection side one end of the negative electrode lead from the positive electrode end portion was −5 mm, that is, the negative electrode connection side one end was located at a position of 5 mm from the positive electrode end portion toward an electrode center side (the negative electrode connection side one end of the negative electrode lead was located over the positive electrode). A cylinder type test battery was manufactured similarly to the example 3-1 except for this.

Evaluation of Battery: Short Circuit Test

Ten batteries were prepared for each example and comparative example, respectively, and it was confirmed whether or not a short occurs at the time of an initial charge and discharge of the test battery by the same method as that of example 1.

Results of the above-described evaluation were shown in Table 3.

TABLE 3

| | Negative electrode active material | R-chamfering of main surface of end portion | Position of electrode connection side end portion | Protruded length "f" from positive electrode end portion [mm] | Protruded length "g" from negative electrode end portion[mm] | Protruded length "h" from negative electrode end portion [mm] | Figure | The number of short circuits |
|---|---|---|---|---|---|---|---|---|
| Example 3-1 | Si | Not performed | Between positive electrode end portion and negative electrode end portion | 1 | 0 | 0 | FIG. 16A | 0/10 |
| Example 3-2 | Si | Not performed | Between positive electrode end portion and negative electrode end portion | 2 | 0 | 0 | FIG. 16A | 0/10 |
| Example 3-3 | Si | Not performed | The same position as that of positive electrode end portion | 0 | 0 | 0 | — | 5/10 |
| Example 3-4 | Si | Performed (FIG. 7A) | Between positive electrode end portion and negative electrode end portion | 1 | 0 | 0 | FIG. 16A | 0/10 |
| Example 3-5 | Si | Performed (FIG. 7A) | The same position as that of positive electrode end portion | 0 | 0 | 0 | — | 2/10 |
| Example 3-6 | Si | Performed (FIG. 7A) | Between the negative electrode end portion and separator | 3 | 1 | 0 | FIG. 16B | 2/10 |
| Example 3-7 | Si | Performed (FIG. 7A) | External side of separator end portion | 4 | 2 | 1 | FIG. 16C | 2/10 |
| Comparative Example 3-1 | Si | Not performed | Over positive electrode | −1 | 0 | 0 | FIG. 16D | 9/10 |
| Comparative Example 3-2 | Si | Performed (FIG. 7A) | Over positive electrode | −1 | 0 | 0 | FIG. 16D | 6/10 |
| Comparative Example 3-3 | Si | Performed (FIG. 7A) | Over positive electrode | −5 | 0 | 0 | FIG. 16D | 9/10 |

As can be seen from Table 3, in a case where the negative electrode connection side one end of the negative electrode lead was located over the positive electrode, even when the processing of the shape of the negative electrode lead end portion was performed, the number of short circuits was six or more.

On the contrary, in a case where the negative electrode connection side one end of the negative electrode lead was located at the same position as that of the positive electrode, even when the processing of the shape of the negative electrode end portion was not performed, the number of short circuits was five or less. In addition, in a case where the negative electrode connection side one end of the negative electrode lead was located at an external side in relation to the positive electrode end portion, even when the processing of the shape of the negative electrode end portion was not performed, the number of short circuits was two or less.

Particularly, as can be seen from the comparison between the examples 3-3 and 3-5, in a case where the negative electrode connection side one end of the negative electrode lead was located at the same position as that of the positive electrode, when the processing of the shape of the negative electrode lead end portion was performed, a short circuit was significantly suppressed.

Example 4

In this example 4, it was confirmed that safety was improved by subjecting edges of the negative electrode lead to a chamfering process using a cylinder type battery in which a connection position of the negative electrode lead was adjusted.

Example 4-1

A cylinder type test battery was manufactured similarly to the example 3-3, except that in regard to both surfaces of a surface, which is opposite to the negative electrode current collector, of the negative electrode lead, and a surface, which is opposite to the separator, of the negative electrode lead, edges of the negative electrode lead was R-chamfered in a chamfering radius of 50 μm and this negative electrode lead was used. That is, the negative electrode active material layer was formed by the application and the connection of the negative electrode lead was performed through welding.

Example 4-2

A cylinder type test battery was manufactured similarly to the example 4-1, except that only the surface, which is opposite to the negative electrode, of the negative electrode lead was subjected to the R-chamfering process and this negative electrode lead was used.

Example 4-3

A cylinder type test battery was manufactured similarly to the example 4-1, except that only the surface, which is opposite to the separator, of the negative electrode lead was subjected to the R-chamfering process and this negative electrode lead was used.

Example 4-4

Figure 17:
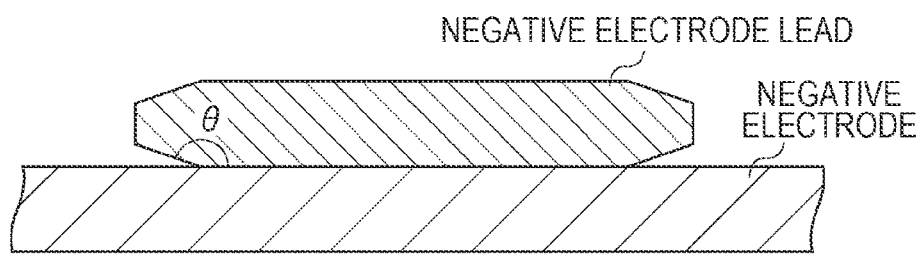
FIG. 17 is a cross-sectional view illustrating the example of the present disclosure.

A cylinder type test battery was manufactured similarly to the example 4-1, except that in regard to both surfaces of a surface, which is opposite to the negative electrode current collector, of the negative electrode lead, and a surface, which is opposite to the separator, of the negative electrode lead, edges of the negative electrode lead were C-chamfered in a chamfering angle θ of 135° as shown in FIG. 17 and this negative electrode lead was used.

Example 4-5

A cylinder type test battery was manufactured similarly to the example 4-1, except that in regard to both surfaces of a surface, which is opposite to the negative electrode current collector, of the negative electrode lead, and a surface, which is opposite to the separator, of the negative electrode lead, edges of the negative electrode lead were C-chamfered in a chamfering angle θ of 150° as shown in FIG. 17 and this negative electrode lead was used.

Example 4-6

As is the case with the example 3-3, a cylinder type test battery using a negative electrode lead that was not subjected to the chamfering process was manufactured.

Evaluation of Battery: Short Circuit Test

Ten batteries were prepared for each example and comparative example, respectively, and it was confirmed whether or not a short occurs at the time of an initial charge and discharge of the test battery by the same method as that of example 1.

Results of the above-described evaluation were shown in Table 4.

TABLE 4

| | | | | Negative electrode lead | | | |
|---|---|---|---|---|---|---|---|
| | Negative electrode active material | Edge chamfering process | Chamfering diameter of R surface [μm] | Chamfering diameter of C surface [°] | Position at which chamfering is performed | Position of electrode connection side end portion | The number of short circuits |
| Example 4-1 | Si | R-Chamfering | 50 | — | Both surfaces | The same position as that of positive electrode end portion | 0/10 |
| Example 4-2 | Si | R-Chamfering | 50 | — | Surface opposite to current collector | The same position as that of positive electrode end portion | 4/10 |
| Example 4-3 | Si | R-Chamfering | 50 | — | surface opposite to separator | The same position as that of positive electrode end portion | 3/10 |
| Example 4-4 | Si | C-Chamfering | — | 135 | Both surfaces | The same position as that of positive electrode end portion | 4/10 |
| Example 4-5 | Si | C-Chamfering | — | 150 | Both surfaces | The same position as that of positive electrode end portion | 3/10 |
| Example 4-6 | Si | Not performed | — | — | — | The same position as that of positive electrode end portion | 5/10 |

As can be seen from Table 4, in a case where the position of the electrode connection side end portion of the negative electrode lead was located at the same position as the positive electrode end portion, as can be seen from the examples 4-1 to 4-5, and the example 4-6, when the edges of the negative electrode lead were subjected to the chamfering process, safety was improved. Particularly, similarly to the examples 4-1 to 4-3, it is preferable that the chamfering process of the negative electrode lead be performed only with respect to at least one surface of the negative electrode lead, it is preferable that the chamfering process be performed with respect to the surface, which is opposite to the separator, of the negative electrode, and it is preferable that the chamfering process be performed with respect to the surfaces, which are opposite to the negative electrode, of the negative electrode lead, and the surface, which is opposite to the separator, of the negative electrode lead. In addition, similarly to the examples 4-4 and 4-5, in a case where the C-chamfering process was performed, when the C-chamfering process was performed in such a manner that an angle with respect to the negative electrode became large, safety was further improved.

Hereinbefore, embodiments of the present disclosure are specifically described, but the present disclosure is not limited to the above-described embodiments, and various modifications may be made without departing from the scope of the present disclosure.

For example, dimensions and configurations in the above-described embodiments are illustrative only, and other dimensions and configurations may be used according to necessity. Particularly, in this present disclosure, the connection position of the electrode lead is important, and a configuration and a material of the battery device, or the like may be arbitrarily selected.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A nonaqueous electrolyte battery, comprising:
 a strip-shaped first electrode that has a first end side and a second end side, wherein the strip-shaped first electrode comprises a plurality of first strips of a first metal;
 a strip-shaped second electrode that has a third end side and a fourth end side, wherein the strip-shaped second electrode comprises a plurality of second strips of a second metal;
 a first electrode lead that has a fifth end side and a sixth end side,
  wherein the fifth end side of the first electrode lead that overlaps with the strip-shaped first electrode, is connected to the strip-shaped first electrode in proximity of the first end side of the strip-shaped first electrode and the sixth end side of the first electrode lead protrudes from the second end side of the strip-shaped first electrode;
 a second electrode lead that has a seventh end side and an eighth end side,
  wherein an edge of the seventh end side of the second electrode lead has a first chamfered shape,
  wherein a main surface of the seventh end side of the second electrode lead, has a second chamfered shape,
  wherein the seventh end side of the second electrode lead that overlaps with the strip-shaped second electrode, is connected to the strip-shaped second electrode in proximity of the third end side of the strip-shaped second electrode and the eighth end side of the second electrode lead protrudes from the fourth end side of the strip-shaped second electrode, and
  wherein the seventh end side of the second electrode lead comprises an insulated portion which comprises a resin material;
 a strip-shaped separator that has a first external area larger than each of a second external area of the strip-shaped first electrode and a third external area of the strip-shaped second electrode;
  wherein the seventh end side of the second electrode lead protrudes from the third end side of the strip-shaped second electrode towards a ninth end side of the strip-shaped separator;
 a nonaqueous electrolyte;
 a laminated film that packages the strip-shaped first electrode and the strip-shaped second electrode; and
 an adhesive film that adheres the laminated film to the first electrode lead and the second electrode lead,
  wherein the adhesive film comprises at least one polyolefin resin.

2. The nonaqueous electrolyte battery according to claim 1, further comprising a metallic exterior body,
 wherein the first electrode lead is electrically connected to a first electrode terminal of the metallic exterior body, and
 wherein the second electrode lead is electrically connected to a second electrode terminal of the metallic exterior body.

3. The nonaqueous electrolyte battery according to claim 1, further comprising:
 a battery lid electrically connected to the sixth end side of the first electrode lead through an electrical connection; and
 a safety valve configured to break the electrical connection between the battery lid and the sixth end side of the first electrode lead, based on an internal pressure of the nonaqueous electrolyte battery greater than or equal to a threshold value.

4. The nonaqueous electrolyte battery according to claim 1, wherein the third external area of the strip-shaped second electrode is larger than the second external area of the strip-shaped first electrode.

5. The nonaqueous electrolyte battery according to claim 1, wherein the first chamfered shape is one of a C-chamfered shape or an R-chamfered shape.

* * * * *